United States Patent
Walkin et al.

(10) Patent No.: US 10,374,986 B2
(45) Date of Patent: Aug. 6, 2019

(54) SCALABLE, REAL-TIME MESSAGING SYSTEM

(71) Applicant: Machine Zone, Inc., East Palo Alto, CA (US)

(72) Inventors: Lev Walkin, Santa Clara, CA (US); Fredrik Erik Linder, Dublin, CA (US)

(73) Assignee: SATORI WORLDWIDE, LLC, Palo Alto, CA (US)

( * ) Notice: Subject to any disclaimer, the term of this patent is extended or adjusted under 35 U.S.C. 154(b) by 0 days.

(21) Appl. No.: 15/244,380

(22) Filed: Aug. 23, 2016

(65) Prior Publication Data

US 2018/0063039 A1 Mar. 1, 2018

(51) Int. Cl.
*G06F 15/16* (2006.01)
*H04L 12/58* (2006.01)
*H04L 29/08* (2006.01)

(52) U.S. Cl.
CPC .............. *H04L 51/04* (2013.01); *H04L 51/14* (2013.01); *H04L 67/1008* (2013.01)

(58) Field of Classification Search
CPC .................................................... H04L 67/327
USPC ................................................. 709/205, 206
See application file for complete search history.

(56) References Cited

U.S. PATENT DOCUMENTS

| | | | |
|---|---|---|---|
| 4,264,924 A | 4/1981 | Freeman | |
| 5,706,331 A | 1/1998 | Wang et al. | |
| 5,878,228 A | 3/1999 | Miller et al. | |
| 6,208,691 B1 | 3/2001 | Balakrishnan et al. | |
| 6,549,959 B1 | 4/2003 | Yates et al. | |
| 7,047,394 B1 | 5/2006 | Van Dyke et al. | |
| 7,065,633 B1 | 6/2006 | Yates, Jr. et al. | |
| 7,376,092 B2 | 5/2008 | Yajnik et al. | |
| 7,420,952 B2 * | 9/2008 | da Costa | H04L 41/0806 370/319 |
| 7,613,813 B2 | 11/2009 | Hussain et al. | |
| 7,668,908 B2 | 2/2010 | Kakivaya et al. | |
| 7,676,580 B2 | 3/2010 | Hill et al. | |

(Continued)

OTHER PUBLICATIONS

Jafarpour et al., Dynamic Load Balancing for Cluster-based Publish/Subscribe System, IEEE, 2009, http://ieeexplore.ieee.org/document/5230660/.*

(Continued)

*Primary Examiner* — Hieu T Hoang
(74) *Attorney, Agent, or Firm* — Womble Bond Dickinson (US) LLP; Daniel E. Ovanezian

(57) ABSTRACT

Methods, systems, and apparatus, including computer programs encoded on a computer storage medium, for balancing loads in a publish-subscribe system. An example method includes: selecting a first hosting node from a plurality of hosting nodes based, at least in part, on a load data selected from at least one of node-specific data representing loads on the plurality of hosting nodes and channel-specific data representing a load associated with a channel; sending a request to the first hosting node to temporarily host a portion of a channel; temporarily hosting the channel portion by the first hosting node by temporarily storing one or more messages published to the channel, and temporarily providing, to a plurality of subscribers to the channel, access to the one or more messages; receiving a request to access the channel portion; and granting permission to access the channel portion.

20 Claims, 8 Drawing Sheets

(56) References Cited

U.S. PATENT DOCUMENTS

| | | | |
|---|---|---|---|
| 7,774,720 B1 | 8/2010 | Demetriades et al. | |
| 7,917,124 B2 | 3/2011 | D'Angelo et al. | |
| 7,929,562 B2 | 4/2011 | Petrovykh | |
| 7,941,448 B2 | 5/2011 | Eslambolchi et al. | |
| 7,970,828 B2 | 6/2011 | Carmeli et al. | |
| 7,970,918 B2 | 6/2011 | Thompson et al. | |
| 8,051,140 B2 | 11/2011 | Lum et al. | |
| 8,065,384 B2 | 11/2011 | Plewnia et al. | |
| 8,065,504 B2 | 11/2011 | Yates, Jr. et al. | |
| 8,074,055 B1 | 12/2011 | Yates, Jr. et al. | |
| 8,086,672 B2 | 12/2011 | Horvitz | |
| 8,121,828 B2 | 2/2012 | Yates, Jr. et al. | |
| 8,375,095 B2 | 2/2013 | Yurkovich et al. | |
| 8,392,555 B2 | 3/2013 | Gale et al. | |
| 8,429,702 B2 | 4/2013 | Yasrebi et al. | |
| 8,441,965 B2 | 5/2013 | Jazra | |
| 8,489,674 B2 | 7/2013 | Srivastava et al. | |
| 8,539,359 B2 | 9/2013 | Rapaport et al. | |
| 8,605,781 B2 | 12/2013 | Rabenold et al. | |
| 8,799,213 B2 | 8/2014 | Wong et al. | |
| 8,850,015 B2 | 9/2014 | Finn | |
| 8,850,490 B1 | 9/2014 | Thomas et al. | |
| 8,856,202 B2 | 10/2014 | McCabe et al. | |
| 8,886,731 B2 | 11/2014 | Gunawardena et al. | |
| 8,898,293 B2 | 11/2014 | Raleigh et al. | |
| 8,937,962 B2 | 1/2015 | Tomonaga et al. | |
| 8,965,409 B2 | 2/2015 | Abhyanker | |
| 9,043,822 B1 | 5/2015 | Calzone et al. | |
| 9,215,261 B2 | 12/2015 | Marcus | |
| 9,270,944 B2 | 2/2016 | Brooks et al. | |
| 9,319,363 B1 | 4/2016 | Walkin et al. | |
| 9,319,365 B1 | 4/2016 | Milyakov | |
| 9,385,976 B1 | 7/2016 | Hafri | |
| 9,397,973 B1 | 7/2016 | Kushnir et al. | |
| 9,407,585 B1 | 8/2016 | Walkin et al. | |
| 9,407,593 B1 | 8/2016 | Milyakov | |
| 9,577,911 B1 | 2/2017 | Castleman | |
| 9,602,450 B1 | 3/2017 | Kushnir et al. | |
| 9,602,455 B2 | 3/2017 | Walkin et al. | |
| 9,608,928 B1 | 3/2017 | Walkin | |
| 9,608,953 B1 | 3/2017 | Kushnir et al. | |
| 2002/0016851 A1 | 2/2002 | Border | |
| 2004/0073641 A1 | 4/2004 | Minhazuddin et al. | |
| 2004/0083264 A1 | 4/2004 | Veselov | |
| 2004/0139166 A1 | 7/2004 | Collison | |
| 2004/0139309 A1 | 7/2004 | Gentil et al. | |
| 2004/0167932 A1 | 8/2004 | Edmonds | |
| 2005/0021622 A1 | 1/2005 | Cullen | |
| 2005/0047396 A1 | 3/2005 | Helm et al. | |
| 2005/0171799 A1 | 8/2005 | Hull et al. | |
| 2005/0210109 A1* | 9/2005 | Brown | H04L 12/1859 |
| | | | 709/206 |
| 2005/0262205 A1 | 11/2005 | Nikolov et al. | |
| 2005/0262215 A1 | 11/2005 | Kirov et al. | |
| 2006/0036679 A1 | 2/2006 | Goodman et al. | |
| 2006/0106840 A1* | 5/2006 | Rooney | H04L 67/26 |
| 2006/0149787 A1 | 7/2006 | Surlaker et al. | |
| 2007/0013948 A1 | 1/2007 | Bevan | |
| 2007/0028173 A1 | 2/2007 | Lauder | |
| 2007/0174233 A1* | 7/2007 | Ginis | H04L 41/145 |
| 2008/0016198 A1 | 1/2008 | Johnston-Watt et al. | |
| 2008/0186973 A1 | 8/2008 | Shihara et al. | |
| 2008/0235366 A1 | 9/2008 | Telfer | |
| 2009/0037514 A1 | 2/2009 | Lankford et al. | |
| 2009/0157795 A1 | 6/2009 | Black | |
| 2009/0222348 A1 | 9/2009 | Ransom et al. | |
| 2009/0287761 A1* | 11/2009 | Hawkins | H04L 67/02 |
| | | | 709/202 |
| 2010/0251262 A1 | 9/2010 | Rokicki et al. | |
| 2011/0060812 A1 | 3/2011 | Middleton | |
| 2011/0176554 A1 | 7/2011 | Yamada et al. | |
| 2011/0179162 A1 | 7/2011 | Mayo | |
| 2011/0231523 A1 | 9/2011 | Haugland et al. | |
| 2011/0320550 A1* | 12/2011 | Lawson | G06F 9/542 |
| | | | 709/206 |
| 2012/0023116 A1 | 1/2012 | Wilkes et al. | |
| 2012/0110599 A1* | 5/2012 | Schoning | G06F 9/542 |
| | | | 719/318 |
| 2012/0150960 A1 | 6/2012 | Nalawade | |
| 2012/0197990 A1 | 8/2012 | Li et al. | |
| 2012/0226797 A1 | 9/2012 | Ghosh et al. | |
| 2012/0271927 A1 | 10/2012 | Shakirzyanov et al. | |
| 2012/0278728 A1 | 11/2012 | Malin et al. | |
| 2012/0284756 A1 | 11/2012 | Kotecha et al. | |
| 2013/0031162 A1 | 1/2013 | Willis et al. | |
| 2013/0066967 A1 | 3/2013 | Alexander | |
| 2013/0067114 A1 | 3/2013 | Hjelm et al. | |
| 2013/0081060 A1 | 3/2013 | Otenko | |
| 2013/0132553 A1* | 5/2013 | Stratton | H04L 41/50 |
| | | | 709/223 |
| 2013/0159472 A1 | 6/2013 | Newton et al. | |
| 2013/0212491 A1 | 8/2013 | Yerli | |
| 2013/0254314 A1 | 9/2013 | Chow | |
| 2013/0290449 A1 | 10/2013 | Norby et al. | |
| 2013/0340097 A1 | 12/2013 | Gowel | |
| 2014/0082085 A1 | 3/2014 | Krishnaprasad et al. | |
| 2014/0114738 A1 | 4/2014 | Tseng et al. | |
| 2014/0189772 A1 | 7/2014 | Yamagishi et al. | |
| 2014/0226713 A1 | 8/2014 | Perlman et al. | |
| 2014/0237057 A1 | 8/2014 | Khodorenko | |
| 2014/0286354 A1* | 9/2014 | Van De Poel | G06F 9/542 |
| | | | 370/463 |
| 2014/0310369 A1 | 10/2014 | Makhervaks et al. | |
| 2014/0372489 A1 | 12/2014 | Jaiswal et al. | |
| 2014/0372755 A1 | 12/2014 | Ristock et al. | |
| 2015/0012598 A1 | 1/2015 | Klimt | |
| 2015/0100664 A1 | 4/2015 | Flack et al. | |
| 2015/0207851 A1 | 7/2015 | Nampally | |
| 2015/0262151 A1 | 9/2015 | Enzminger et al. | |
| 2015/0317676 A1 | 11/2015 | Reid et al. | |
| 2015/0365358 A1 | 12/2015 | Strassner | |
| 2015/0379160 A1 | 12/2015 | Avraham et al. | |
| 2016/0072865 A1 | 3/2016 | Kaplinger et al. | |
| 2016/0219089 A1 | 7/2016 | Murthy et al. | |
| 2016/0261263 A1 | 9/2016 | Agarwal et al. | |
| 2016/0285986 A1 | 9/2016 | Mokhtari et al. | |
| 2018/0027068 A1* | 1/2018 | Kumar | G06Q 50/01 |
| | | | 709/206 |

OTHER PUBLICATIONS

Bustamante, F., "The Active Streams Approach to Adaptive Distributed Applications and Services," Thesis, Georgia Institute of Technology; 112pgs.; Nov. 2001.

Chakravarthy, S. and Vontella, N., "A Publish / Subscribe Based Architecture of an Alert Server to Support Prioritized and Persistent Alerts," Lecture Notes in Computer Science; 3347:1-6-116; Jan. 2004.

Cilia, M., et al., "Looking into the Past: Enhancing Mobile Publish/Subscribe Middleware," Proceedings of the 2nd Int'l Workshop on Distributed Event-based Systems (DEBS '03); pp. 1-8; Jun. 2003.

Corsaro, A., et al., "Quality of Service in Publish/Subscribe Middleware," IOS Press; pp. 1-19; 2003.

Int'l Search Report and Written Opinion of the ISA/EP in PCT/US2016/022316; dated Jun. 1, 2016; 11pgs.

Int'l Search Report and Written Opinion of the ISA/EP in PCT/US2016/023164; dated Jul. 11, 2016; 15pgs.

King, A., et al., "Load Balancing Content-Based Publish/Subscribe Systems," ACM Transactions on Computer Systems; 28(4):9:1-9:55; Dec. 2010.

Vahdat, A. and Becker, D., "Epidemic Routing for Partially-Connected Ad Hoc Networks," Duke University; 14pgs.; Jul. 2000.

Zeidler, et al., "Mobility Support with REBECA," Proc. 23rd Int'l Conference on Distributed Computing Systems Workshops; May 19-22, 2003; 7pgs.

"Cloud Pub/Sub," accessed on the internet at: https://cloud.google.com/pubsub/overview; downloaded Aug. 7, 2015; 5pgs.

"Publish—subscribe pattern"; accessed on the internet at: https://en.wikipedia.org/wiki/Publish%E2%80%93subscribe_pattern; downloaded Aug. 7, 2015; 4pgs.

(56) References Cited

OTHER PUBLICATIONS

"Welcome to PyPubSub's Home Page!," accessed on the internet at: http://pubsub.sourceforge.net/; downloaded Aug. 7, 2015; 2pgs.
U.S. Appl. No. 15/223,392, filed Jul. 29, 2016, Scalable, Real-Time Messaging System, Walkin et al.
U.S. Appl. No. 14/821,421, filed Aug. 7, 2015, Scalable, Real-Time Messaging System, Walkin et al.
U.S. Appl. No. 15/067,476, filed Mar. 11, 2016, Scalable, Real-Time Messaging System, Walkin et al.
U.S. Appl. No. 15/175,588, filed Jun. 7, 2016, Message Compression in Scalable Messaging System, Walkin.
U.S. Appl. No. 15/231,044, filed Aug. 8, 2016, Access Control for Message Channels in a Messaging System, Walkin et al.
U.S. Appl. No. 15/244,380, filed Aug. 23, 2016, Scalable, Real-Time Messaging System, Walkin.
U.S. Appl. No. 15/202,908, filed Jul. 6, 2016, Multiple-Speed Message Channel of Messaging System, Walkin.
U.S. Appl. No. 15/063,390, filed Mar. 7, 2016, Systems and Methods for Storing and Transferring Message Data, Milyakov.
U.S. Appl. No. 14/879,661, filed Oct. 9, 2015, Systems and Methods for Storing Message Data, Hafri.
U.S. Appl. No. 15/196,597, filed Jun. 29, 2016, Systems amd Methods for Transferring Message Data, Kushnir et al.
U.S. Appl. No. 15/155,384, filed May 16, 2016, Maintaining Persistence of a Messaging System, Kushnir, et al.
Cagle, K., "Convert a Text File to XML," accessed on the Internet at http://www.devx.com/getHelpOn/10MinuteSolution/20356; downloaded Sep. 22, 2016; 8pgs.
Phanishayee, A., "Chaining for Flexible and High-Performance Key-Value Systems," Doctoral Dissertation, Carnegie Mellon University, School of Computer Science; 148pgs.; Sep. 2012.
U.S. Appl. No. 15/274,281, filed Sep. 23, 2016, Systems and Methods for Providing Messages to Multiple Subscribers, Milyakov.
U.S. Appl. No. 15/252,989, filed Aug. 31, 2016, Data Replication in Scalable Messaging System, Hafri et al.
Int'l Search Report and Written Opinion of the ISA/EP in PCT/US2016/039958; dated Oct. 4, 2016; 11pgs.
U.S. Appl. No. 15/290,695, filed Oct. 11, 2016, Systems and Methods for Storing Message Data, Hafri.
U.S. Appl. No. 15/291,633, filed Oct. 12, 2016, Systems and Methods for Storing and Transferring Message Data, Milyakov.
U.S. Appl. No. 15/443,286, filed Feb. 24, 2017, Data Storage Systems and Methods Using A Real-Time Messaging System.
U.S. Appl. No. 15/442,061, filed Feb. 24, 2017, Channel Management in Scalable Messaging System.
U.S. Appl. No. 15/442,036, filed Feb. 24, 2017, Selective Distribution of Messages in A Scalable, Real-Time Messaging System.
U.S. Appl. No. 15/436,217, filed Feb. 17, 2017, Scalable, Real-Time Messaging System.
U.S. Appl. No. 15/435,915, filed Feb. 17, 2017, Systems and Methods for Transferring Message Data.
U.S. Appl. No. 15/443,550, filed Feb. 15, 2017, Maintaining Persistence of A Messaging System.
U.S. Appl. No. 15/433,525, filed Feb. 15, 2017, Multiple-Speed Message Channel of Messaging System.
Int'l Search Report and Written Opinion of the ISA/EP in PCT/US2014/041531; dated Oct. 6, 2016; 12 pgs.
Int'l Search Report and Written Opinion of the ISA/EP in PCT/US2016/037358; dated Oct. 10, 2016; 13pgs.
Int'l Search Report and Written Opinion of the ISA/EP in PCT/US2016/041530; dated Oct. 6, 2016; 12pgs.
Jafarpour H et al., (2009), 'Dynamic Load Balancing for Cluster-Based Publish Subscribe System,' 9th Annual International Symposium on applications and the Internet, Bellevue, WA, Jul. 20-24, 2009, IEEE, Piscataway, NJ (Pub), (7 pages), downloaded from the internet at <http://ieeexplore.ieee.org/document/5230660/> on Dec. 22, 2016.
Preshing J, 'Atomic v. Non-Atomic Operations,' *Preshing on Programming*, Jun. 18, 2013, J Preshing (Ed), Octopress (Pub), XP-002762097 (10 pages) downloaded from <http://preshing.com/20130618/atomic-vs-non-atomic-operations on Sep. 20, 2016.
PCT/US2017/036349; International Search Report and Written Opinion dated Jul. 27, 2017; 13 pages.

\* cited by examiner

SCALABLE, REAL-TIME MESSAGING SYSTEM

BACKGROUND

This specification relates to a data communication system and, in particular, a system that implements real-time, scalable publish-subscribe messaging.

The publish-subscribe pattern (or "PubSub") is a data communication messaging arrangement implemented by software systems where so-called publishers publish messages to topics and so-called subscribers receive the messages pertaining to particular topics to which they are subscribed. There can be one or more publishers per topic and publishers generally have no knowledge of what subscribers, if any, will receive the published messages. Some PubSub systems do not cache messages or have small caches meaning that subscribers may not receive messages that were published before the time of subscription to a particular topic. PubSub systems can be susceptible to performance instability during surges of message publications or as the number of subscribers to a particular topic increases.

SUMMARY

In general, one aspect of the subject matter described in this specification can be embodied in a computer-implemented load-balancing method for a publish-subscribe system. The method includes: selecting a first hosting node from a plurality of hosting nodes based, at least in part, on load data selected from at least one of node-specific data representing loads on the plurality of hosting nodes and channel-specific data representing a load associated with a channel; sending a request to the first hosting node to temporarily host a portion of the channel; temporarily hosting the channel portion by the first hosting node by temporarily storing one or more messages published to the channel, and temporarily providing, to a plurality of subscribers to the channel, access to the one or more messages; receiving a request to access the channel portion; and granting permission to access the channel portion.

In certain examples, the node-specific data includes one or more load metrics, which can be or include, for example: a number of channel portions being temporarily hosted by the respective hosting nodes, a number of interface nodes having permission to access the respective hosting nodes, a data reception rate of the respective hosting nodes, a data transmission rate of the respective hosting nodes, a storage utilization of the respective hosting nodes, and/or a processing rate of the respective hosting nodes. The method can include receiving at least a portion of the node-specific data from the plurality of hosting nodes. Alternatively or additionally, the method can include determining at least a portion of the node-specific data based, at least in part, on received requests to access channel portions and on permissions granted to access channel portions.

In some examples, the channel-specific data includes one or more load metrics, which can be or include, for example: a number of subscribers to the channel, a number of publishers to the channel, a rate at which messages are published to the channel, a rate at which messages are read from the channel, a number of interface nodes having permission to access the channel, and/or a channel portion size for the channel. The method can include receiving at least a portion of the channel-specific data from at least one of a hosting node and an interface node. Selecting the first hosting node from the plurality of hosting nodes based, at least in part, on the load data can include: determining, based at least in part on the node-specific data, that a load on the first hosting node is lowest among respective loads on the hosting nodes; and selecting the first hosting node based, at least in part, on the determination. In some instances, selecting the first hosting node from the plurality of hosting nodes based, at least in part, on the load data includes: determining, based at least in part on the node-specific data, that a load on the first hosting node is below a threshold load level; and selecting the first hosting node based, at least in part, on the determination.

In various implementations, selecting the first hosting node from the plurality of hosting nodes based, at least in part, on the load data includes: determining, based at least in part on a portion of the node-specific data corresponding to the first hosting node and on a portion of the channel-specific data corresponding to the channel, an expected load on the first hosting node that would result from the first hosting node hosting the portion of the channel; determining that the expected load on the first hosting node is below a threshold load level; and selecting the first hosting node based, at least in part, on the determination that the expected load on the first hosting node is below the threshold load level. The channel portion can include a first portion of the channel, the channel can include a second portion, and selecting the first hosting node from the plurality of hosting nodes based, at least in part, on the load data can include: determining that the first hosting node hosts the second channel portion; determining that a load on the first hosting node is below a threshold load level; and selecting the first hosting node based, at least in part, on the determinations that the first hosting node hosts the second channel portion and that the load on the first hosting node is below the threshold load level.

In certain examples, the channel portion includes a first portion of the channel, the channel further includes a second portion, and selecting the first hosting node from the plurality of hosting nodes based, at least in part, on the load data includes: determining that a second hosting node hosts the second channel portion; determining that a load on the second hosting node is above a threshold load level; determining that a load on the first hosting node is below the threshold load level; and selecting the first hosting node based, at least in part, on the determinations that the load on the second hosting node is above the threshold load level and that the load on the first hosting node is below the threshold load level. In one example, selecting the first hosting node from the plurality of hosting nodes based, at least in part, on the load data includes: determining, based at least in part on a portion of the channel-specific data, an expected load associated with hosting the channel portion; determining, based at least in part on the node-specific data and on the expected load associated with hosting the channel portion, that hosting the channel portion on the first hosting node would reduce inequality of load distribution among the hosting nodes; and selecting the first hosting node based, at least in part, on the determination that hosting the channel portion on the first hosting node would reduce inequality of load distribution among the hosting nodes.

In another aspect, the subject matter of this specification relates to a publish-subscribe system having a plurality of hosting nodes, an interface node, and a channel manager node. The system is operable to perform operations including: selecting a first hosting node from the plurality of hosting nodes based, at least in part, on a load data selected from at least one of node-specific data representing loads on the plurality of hosting nodes and channel-specific data representing a load associated with a channel; sending a request to the first hosting node to temporarily host a portion of the channel, wherein the first hosting node temporarily hosts the channel portion by temporarily storing one or more messages published to the channel, and temporarily providing, to a plurality of subscribers to the channel, access to the one or more messages; receiving, from the interface node, a request to access the channel portion; and granting, to the interface node, permission to access the channel portion.

In various instances, the operation of selecting the first hosting node from the plurality of hosting nodes based, at least in part, on the load data includes: determining, based at least in part on the node-specific data, that a load on the first hosting node is lowest among respective loads on the hosting nodes; and selecting the first hosting node based, at least in part, on the determination. The operation of selecting the first hosting node from the plurality of hosting nodes based, at least in part, on the load data can include: determining, based at least in part on the node-specific data, that a load on the first hosting node is below a threshold load level; and selecting the first hosting node based, at least in part, on the determination. In some examples, the operation of selecting the first hosting node from the plurality of hosting nodes based, at least in part, on the load data includes: determining, based at least in part on a portion of the node-specific data corresponding to the first hosting node and on a portion of the channel-specific data corresponding to the channel, an expected load on the first hosting node that would result from the first hosting node hosting the portion of the channel; determining that the expected load on the first hosting node is below a threshold load level; and selecting the first hosting node based, at least in part, on the determination that the expected load on the first hosting node is below the threshold load level.

In certain implementations, the channel portion includes a first portion of the channel, the channel further includes a second portion, and the operation of selecting the first hosting node from the plurality of hosting nodes based, at least in part, on the load data includes: determining that the first hosting node hosts the second channel portion; determining that a load on the first hosting node is below a threshold load level; and selecting the first hosting node based, at least in part, on the determinations that the first hosting node hosts the second channel portion and that the load on the first hosting node is below the threshold load level. In some instances, the channel portion includes a first portion of the channel, the channel further includes a second portion, and the operation of selecting the first hosting node from the plurality of hosting nodes based, at least in part, on the load data includes: determining that a second hosting node hosts the second channel portion; determining that a load on the second hosting node is above a threshold load level; determining that a load on the first hosting node is below the threshold load level; and selecting the first hosting node based, at least in part, on the determinations that the load on the second hosting node is above the threshold load level and that the load on the first hosting node is below the threshold load level. In one example, the operation of selecting the first hosting node from the plurality of hosting nodes based, at least in part, on the load data includes: determining, based at least in part on a portion of the channel-specific data, an expected load associated with hosting the channel portion; determining, based at least in part on the node-specific data and on the expected load associated with hosting the channel portion, that hosting the channel portion on the first hosting node would reduce inequality of load distribution among the hosting nodes; and selecting the first hosting node based, at least in part, on the determination that hosting the channel portion on the first hosting node would reduce inequality of load distribution among the hosting nodes.

In another aspect, the subject matter of this specification relates to an article that includes a non-transitory machine-readable medium having instructions stored thereon that when executed by one or more computers causes the computers to perform operations including: selecting a first hosting node from a plurality of hosting nodes based, at least in part, on a load data selected from at least one of node-specific data representing loads on the plurality of hosting nodes and channel-specific data representing a load associated with a channel; sending, to the first hosting node, a request to temporarily host a portion of the channel; temporarily hosting the channel portion by the first hosting node by temporarily storing one or more messages published to the channel, and temporarily providing, to a plurality of subscribers to the channel, access to the one or more messages; receiving a request to access the channel portion; and granting permission to access the channel portion.

Elements of embodiments or examples described with respect to a given aspect of the invention can be used in various embodiments or examples of another aspect of the invention. For example, it is contemplated that features of dependent claims depending from one independent claim can be used in apparatus, systems, and/or methods of any of the other independent claims.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1A:
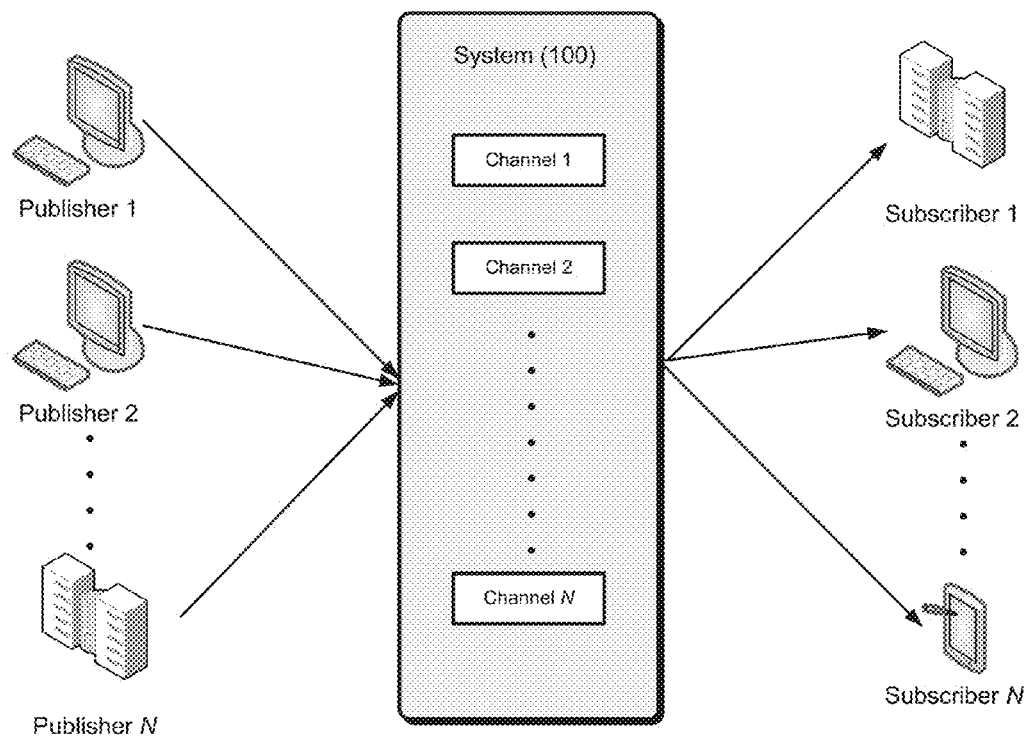
FIG. 1A illustrates an example system that supports the Pub Sub communication pattern.

FIG. 1A illustrates an example system 100 that supports the Pub Sub communication pattern. Publisher clients (e.g., Publisher 1) can publish messages to named channels (e.g., "Channel 1") by way of the system 100. A message can comprise any type of information including one or more of the following: text, image content, sound content, multimedia content, video content, binary data, and so on. Other types of message data are possible. Subscriber clients (e.g., Subscriber 2) can subscribe to a named channel using the system 100 and start receiving messages which occur after the subscription request or from a given position (e.g., a message number or time offset). A client can be both a publisher and a subscriber.

Depending on the configuration, a PubSub system can be categorized as follows:

One to One (1:1). In this configuration there is one publisher and one subscriber per channel. A typical use case is private messaging.

One to Many (1:N). In this configuration there is one publisher and multiple subscribers per channel. Typical use cases are broadcasting messages (e.g., stock prices).

Many to Many (M:N). In this configuration there are many publishers publishing to a single channel. The messages are then delivered to multiple subscribers. Typical use cases are map applications.

There is no separate operation needed to create a named channel. A channel is created implicitly when the channel is subscribed to or when a message is published to the channel. In some implementations, channel names can be qualified by a name space. A name space comprises one or more channel names. Different name spaces can have the same channel names without causing ambiguity. The name space name can be a prefix of a channel name where the name space and channel name are separated by a dot or other suitable separator. In some implementations, name spaces can be used when specifying channel authorization settings. For instance, the messaging system 100 may have app1.foo and app1.system.notifications channels where "app1" is the name of the name space. The system can allow clients to subscribe and publish to the app1.foo channel. However, clients can only subscribe to, but not publish to the app1.system.notifications channel.

Figure 1B:
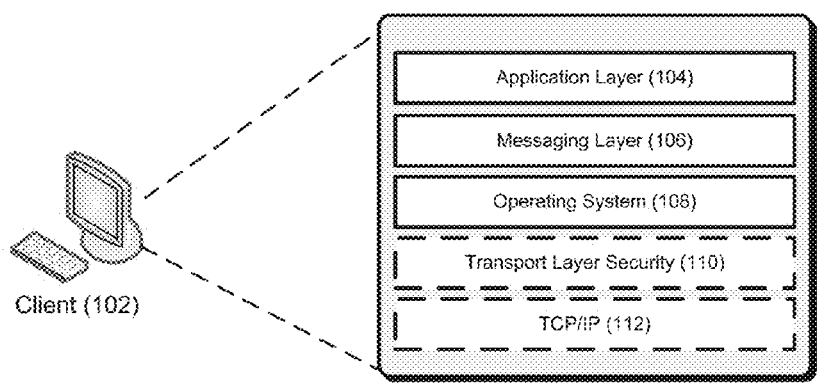
FIG. 1B illustrates functional layers of software on an example client device.

FIG. 1B illustrates functional layers of software on an example client device. A client device (e.g., client 102) is a data processing apparatus such as, for example, a personal computer, a laptop computer, a tablet computer, a smart phone, a smart watch, or a server computer. Other types of client devices are possible. The application layer 104 comprises the end-user application(s) that will integrate with the Pub Sub system 100. The messaging layer 106 is a programmatic interface for the application layer 104 to utilize services of the system 100 such as channel subscription, message publication, message retrieval, user authentication, and user authorization. In some implementations, the messages passed to and from the messaging layer 106 are encoded as JavaScript Object Notation (JSON) objects. Other message encoding schemes are possible.

The operating system 108 layer comprises the operating system software on the client 102. In various implementations, messages can be sent and received to/from the system 100 using persistent or non-persistent connections. Persistent connections can be created using, for example, network sockets. A transport protocol such as TCP/IP layer 112 implements the Transport Control Protocol/Internet Protocol communication with the system 100 that can be used by the messaging layer 106 to send messages over connections to the system 100. Other communication protocols are possible including, for example, User Datagram Protocol (UDP). In further implementations, an optional Transport Layer Security (TLS) layer 110 can be employed to ensure the confidentiality of the messages.

Figure 2:
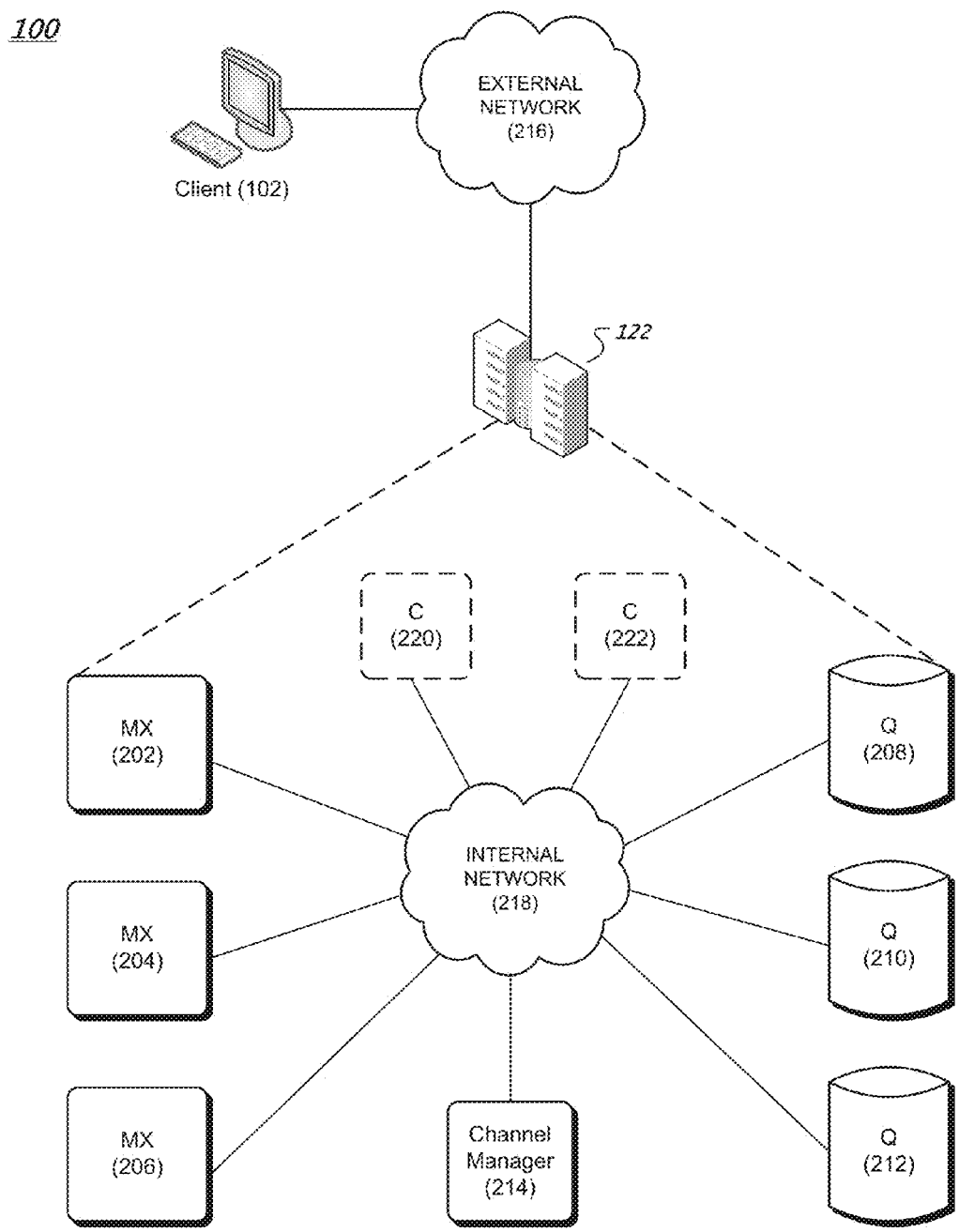
FIG. 2 is a diagram of an example messaging system.

FIG. 2 is a diagram of an example messaging system 100. The system 100 provides functionality for implementing PubSub communication patterns. The system comprises software components and storage that can be deployed at one or more data centers 122 in one or more geographic locations, for example. The system comprises MX nodes (e.g., MX nodes or multiplexer nodes 202, 204 and 206), Q nodes (e.g., Q nodes or queue nodes 208, 210 and 212), one or more channel manager nodes (e.g., channel managers 214, 215), and optionally one or more C nodes (e.g., C nodes or cache nodes 220 and 222). Each node can execute in a virtual machine or on a physical machine (e.g., a data processing apparatus). Each MX node serves as a termination point for one or more publisher and/or subscriber connections through the external network 216. The internal communication among MX nodes, Q nodes, C nodes, and the channel manager, is conducted over an internal network 218, for example. By way of illustration, MX node 204 can be the terminus of a subscriber connection from client 102. Each Q node buffers channel data for consumption by the MX nodes. An ordered sequence of messages published to a channel is a logical channel stream. For example, if three clients publish messages to a given channel, the combined messages published by the clients comprise a channel stream. Messages can be ordered in a channel stream, for example, by time of publication by the client, by time of receipt by an MX node, or by time of receipt by a Q node. Other ways for ordering messages in a channel stream are possible. In the case where more than one message would be assigned to the same position in the order one of the messages can be chosen (e.g., randomly) to have a later sequence in the order. Each channel manager node is responsible for managing Q node load by splitting channel streams into so-called streamlets (also referred to herein as "channel portions"). Streamlets are discussed further below. The optional C nodes provide caching and load removal from the Q nodes. Q nodes may also be referred to herein as "hosting nodes." MX nodes may also be referred to herein as "interface nodes."

In the example messaging system 100, one or more client devices (publishers and/or subscribers) establish respective persistent connections (e.g., TCP connections) to an MX node (e.g., MX node 204). The MX node serves as a termination point for these connections. For instance, external messages (e.g., between respective client devices and the MX node) carried by these connections can be encoded based on an external protocol (e.g., JSON). The MX node terminates the external protocol and translates the external messages to internal communication, and vice versa. The MX nodes publish and subscribe to streamlets on behalf of clients. In this way, an MX node can multiplex and merge requests of client devices subscribing for or publishing to the same channel, thus representing multiple client devices as one, instead of one by one.

In the example messaging system 100, a Q node (e.g., Q node 208) can store one or more streamlets of one or more channel streams. A streamlet is a data buffer for a portion of a channel stream. A streamlet will close to writing when its storage is full. A streamlet will close to reading and writing and be de-allocated when its time-to-live (TTL) has expired. By way of illustration, a streamlet can have a maximum size of 1 MB and a TTL of three minutes. Different channels can have streamlets limited by different sizes and/or by different TTLs. For instance, streamlets in one channel can exist for up to three minutes, while streamlets in another channel can exist for up to 10 minutes. In various implementations, a streamlet corresponds to a computing process running on a Q node. The computing process can be terminated after the streamlet's TTL has expired, thus freeing up computing resources (for the streamlet) back to the Q node, for example.

When receiving a publish request from a client device, an MX node (e.g., MX node 204) makes a request to a channel manager (e.g., channel manager 214) to grant access to a streamlet to write the message being published. Note, however, that if the MX node has already been granted write access to a streamlet for the channel (and the channel has not been closed to writing), the MX node can write the message to that streamlet without having to request a grant to access the streamlet. Once a message is written to a streamlet for a channel, the message can be read by MX nodes and provided to subscribers of that channel.

Similarly, when receiving a channel subscription request from a client device, an MX node makes a request to a channel manager to grant access to a streamlet for the channel from which messages are read. If the MX node has already been granted read access to a streamlet for the channel (and the channel's TTL has not been closed to reading) the MX node can read messages from the streamlet without having to request a grant to access the streamlet. The read messages can then be forwarded to client devices that have subscribed to the channel. In various implementations, messages read from streamlets are cached by MX nodes so that MX nodes can reduce the number of times needed to read from the streamlets.

By way of illustration, an MX node can request a grant from the channel manager that allows the MX node to store a block of data into a streamlet on a particular Q node that stores streamlets of the particular channel. Example streamlet grant request and grant data structures are as follows:

```
StreamletGrantRequest = {
    "channel": string( )
    "mode": "read" | "write"
    "position": 0
}
StreamletGrantResponse = {
    "streamlet-id": "abcdef82734987",
    "limit-size": 2000000, # 2 megabytes max
    "limit-msgs": 5000, # 5 thousand messages max
    "limit-life": 4000, # the grant is valid for 4 seconds
    "q-node": string( )
    "position": 0
}
```

The StreamletGrantRequest data structure stores the name of the stream channel and a mode indicating whether the MX node intends on reading from or writing to the streamlet. The MX node sends the StreamletGrantRequest to a channel manager node. The channel manager node, in response, sends the MX node a StreamletGrantResponse data structure. The StreamletGrantResponse contains an identifier of the streamlet (streamlet-id), the maximum size of the streamlet (limit-size), the maximum number of messages that the streamlet can store (limit-msgs), the TTL (limit-life), and an identifier of a Q node (q-node) on which the streamlet resides. The StreamletGrantRequest and StreamletGrantResponse can also have a position field that points to a position in a streamlet (or a position in a channel) for reading from the streamlet.

A grant becomes invalid once the streamlet has closed. For example, a streamlet is closed to reading and writing once the streamlet's TTL has expired and a streamlet is closed to writing when the streamlet's storage is full. When a grant becomes invalid, the MX node can request a new grant from the channel manager to read from or write to a streamlet. The new grant will reference a different streamlet and will refer to the same or a different Q node depending on where the new streamlet resides.

Figure 3A:
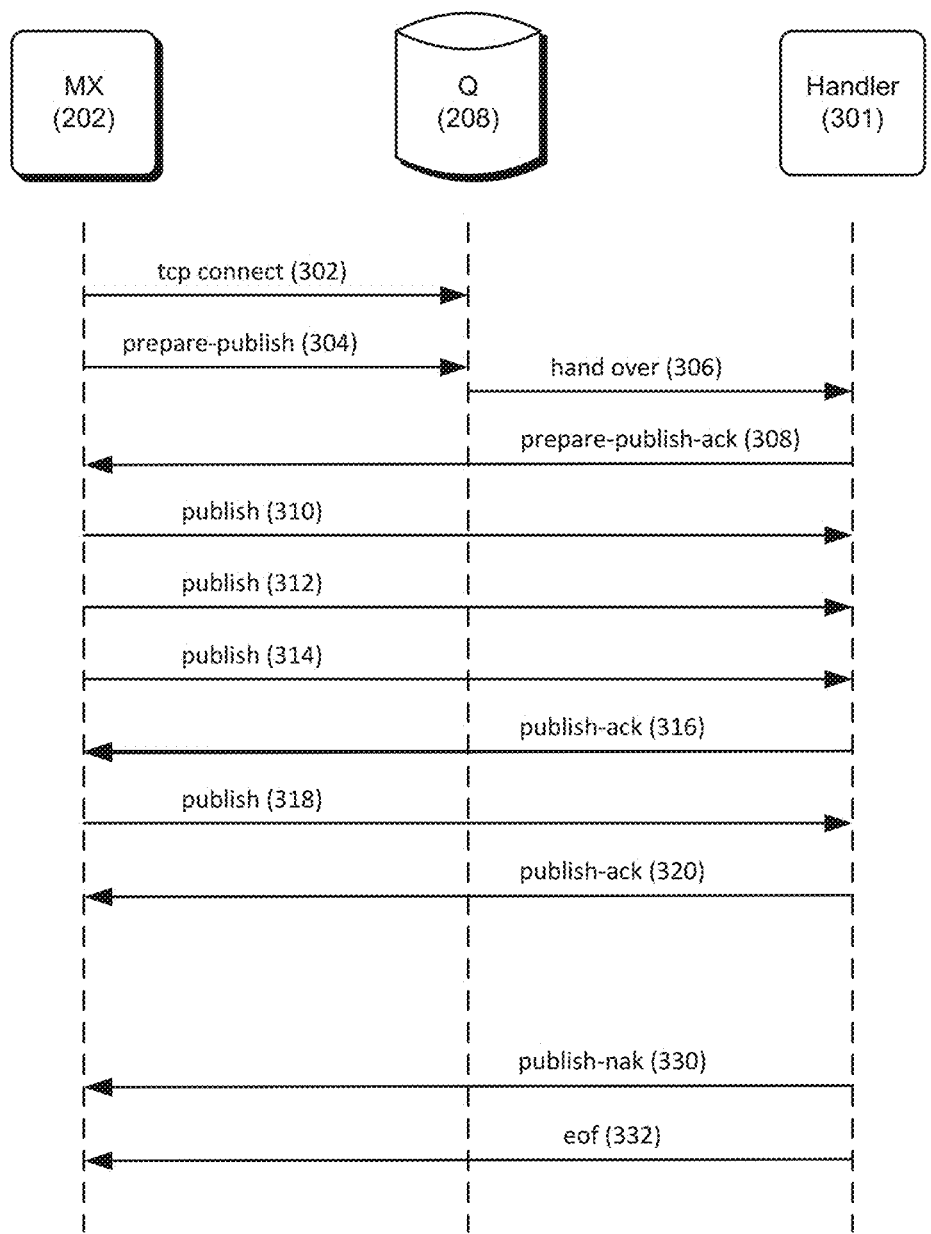
FIG. 3A is a data flow diagram of an example method for writing data to a streamlet.

FIG. 3A is a data flow diagram of an example method for writing data to a streamlet in various embodiments. In FIG. 3A, when an MX node (e.g., MX node 202) request to write to a streamlet is granted by a channel manager (e.g., channel manager 214), as described before, the MX node establishes a Transmission Control Protocol (TCP) connection with the Q node (e.g., Q node 208) identified in the grant response received from the channel manager (302). A streamlet can be written concurrently by multiple write grants (e.g., for messages published by multiple publisher clients). Other types of connection protocols between the MX node and the Q node are possible.

The MX node then sends a prepare-publish message with an identifier of a streamlet that the MX node wants to write to the Q node (304). The streamlet identifier and Q node identifier can be provided by the channel manager in the write grant as described earlier. The Q node hands over the message to a handler process 301 (e.g., a computing process running on the Q node) for the identified streamlet (306). The handler process can send to the MX node an acknowledgement (308). After receiving the acknowledgement, the MX node starts writing (publishing) messages (e.g., 310, 312, 314, and 318) to the handler process, which in turns stores the received data in the identified streamlet. The handler process can also send acknowledgements (316, 320) to the MX node for the received data. In some implementations, acknowledgements can be piggy-backed or cumulative. For instance, the handler process can send to the MX node an acknowledgement for every predetermined amount of data received (e.g., for every 100 messages received) or for every predetermined time period (e.g., for every one millisecond). Other acknowledgement scheduling algorithms, such as Nagle's algorithm, can be used.

If the streamlet can no longer accept published data (e.g., when the streamlet is full), the handler process sends a Negative-Acknowledgement (NAK) message (330) indicating a problem, following by an EOF (end-of-file) message (332). In this way, the handler process closes the association with the MX node for the publish grant. The MX node can then request a write grant for another streamlet from a channel manager if the MX node has additional messages to store.

Figure 3B:
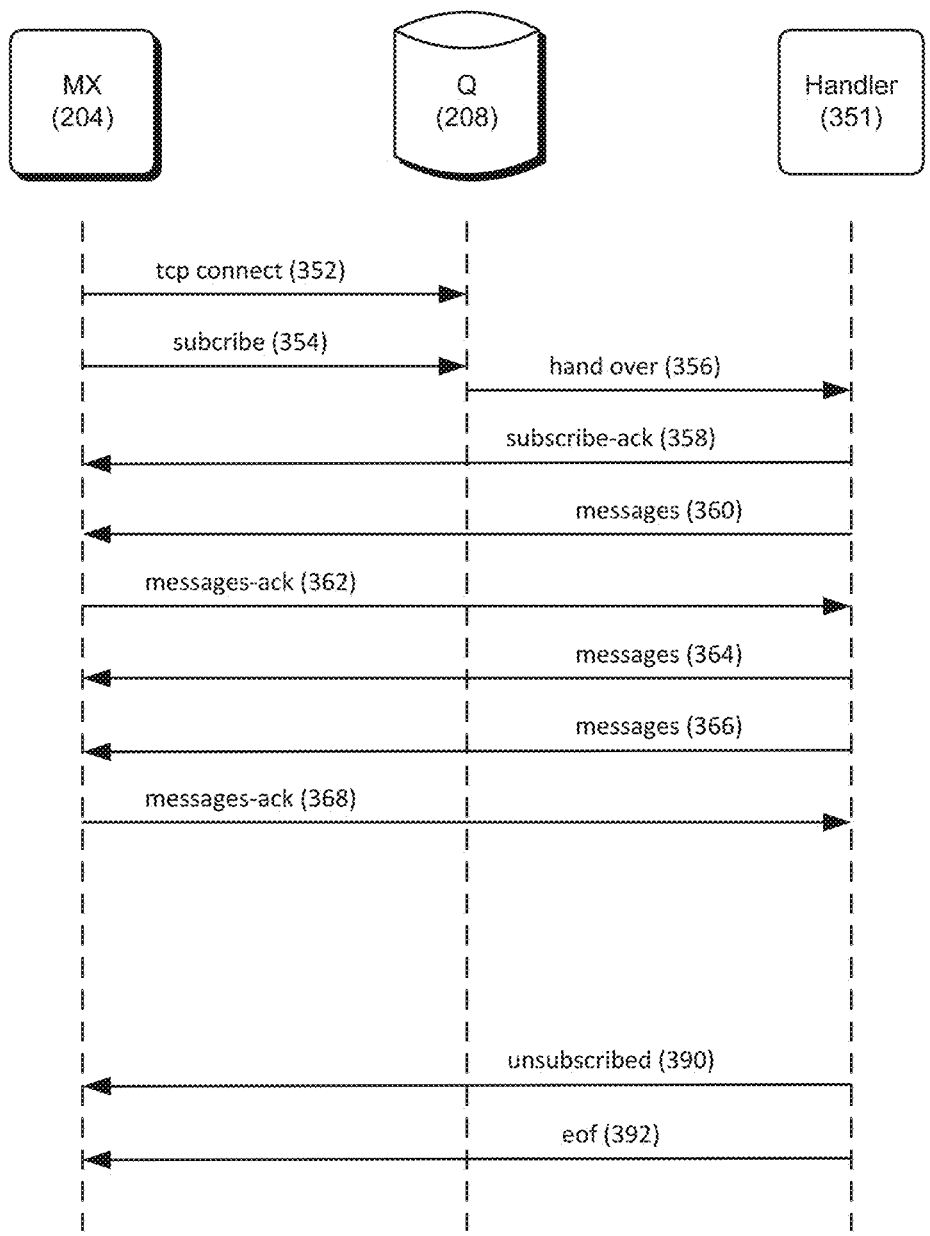
FIG. 3B is a data flow diagram of an example method for reading data from a streamlet.

FIG. 3B is a data flow diagram of an example method for reading data from a streamlet in various embodiments. In FIG. 3B, an MX node (e.g., MX node 204) sends to a channel manager (e.g., channel manager 214) a request for reading a particular channel starting from a particular message or time offset in the channel. The channel manager returns to the MX node a read grant including an identifier of a streamlet containing the particular message, a position in the streamlet corresponding to the particular message, and an identifier of a Q node (e.g., Q node 208) containing the particular streamlet. The MX node then establishes a TCP connection with the Q node (352). Other types of connection protocols between the MX node and the Q node are possible.

The MX node then sends to the Q node a subscribe message (354) with the identifier of the streamlet (in the Q node) and the position in the streamlet from which the MX node wants to read (356). The Q node hands over the subscribe message to a handler process 351 for the streamlet (356). The handler process can send to the MX node an acknowledgement (358). The handler process then sends messages (360, 364, 366), starting at the position in the streamlet, to the MX node. In some implementations, the handler process can send all of the messages in the streamlet to the MX node. After sending the last message in a particular streamlet, the handler process can send a notification of the last message to the MX node. The MX node can send to the channel manager another request for another streamlet containing a next message in the particular channel.

If the particular streamlet is closed (e.g., after its TTL has expired), the handler process can send an unsubscribe message (390), followed by an EOF message (392), to close the association with the MX node for the read grant. The MX node can close the association with the handler process when the MX node moves to another streamlet for messages in the particular channel (e.g., as instructed by the channel manager). The MX node can also close the association with the handler process if the MX node receives an unsubscribe message from a corresponding client device.

In various implementations, a streamlet can be written into and read from at the same time instance. For instance, there can be a valid read grant and a valid write grant at the same time instance. In various implementations, a streamlet can be read concurrently by multiple read grants (e.g., for channels subscribed to by multiple publisher clients). The handler process of the streamlet can order messages from concurrent write grants based on, for example, time-of-arrival, and store the messages based on the order. In this way, messages published to a channel from multiple publisher clients can be serialized and stored in a streamlet of the channel.

In the messaging system 100, one or more C nodes (e.g., C node 220) can offload data transfers from one or more Q nodes. For instance, if there are many MX nodes requesting streamlets from Q nodes for a particular channel, the streamlets can be offloaded and cached in one or more C nodes. The MX nodes (e.g., as instructed by read grants from a channel manager) can read the streamlets from the C nodes instead.

As described above, messages for a channel in the messaging system 100 are ordered in a channel stream. A channel manager (e.g., channel manager 214) splits the channel stream into fixed-sized streamlets that each reside on a respective Q node. In this way, storing a channel stream can be shared among many Q nodes; each Q node stores a portion (one or more streamlets) of the channel stream. More particularly, a streamlet can be stored in, for example, registers and/or dynamic memory elements associated with a computing process on a Q node, thus avoiding the need to access persistent, slower storage devices such as hard disks. This results in faster message access. The channel manager can also balance load among Q nodes in the messaging system 100 by monitoring respective workloads of the Q nodes and allocating streamlets in a way that avoids overloading any one Q node.

In various implementations, a channel manager maintains a list identifying each active streamlet, the respective Q node on which the streamlet resides, an identification of the position of the first message in the streamlet, and whether the streamlet is closed for writing. In some implementations, Q nodes notify the channel manager and any MX nodes that are publishing to a streamlet that the streamlet is closed due to being full or when the streamlet's TTL has expired. When a streamlet is closed, the streamlet remains on the channel manager's list of active streamlets until the streamlet's TTL has expired so that MX nodes can continue to retrieve messages from the streamlet.

When an MX node requests a write grant for a given channel and there is not a streamlet for the channel that can be written to, the channel manager allocates a new streamlet on one of the Q nodes and returns the identity of the streamlet and the Q node in the StreamletGrantResponse. Otherwise, the channel manager returns the identity of the currently open for writing streamlet and corresponding Q node in the StreamletGrantResponse. MX nodes can publish messages to the streamlet until the streamlet is full or the streamlet's TTL has expired, after which a new streamlet can be allocated by the channel manager.

When an MX node requests a read grant for a given channel and there is not a streamlet for the channel that can be read from, the channel manager allocates a new streamlet on one of the Q nodes and returns the identity of the streamlet and the Q node in the StreamletGrantResponse. Otherwise, the channel manager returns the identity of the streamlet and Q node that contains the position from which the MX node wishes to read. The Q node can then begin sending messages to the MX node from the streamlet beginning at the specified position until there are no more messages in the streamlet to send. When a new message is published to a streamlet, MX nodes that have subscribed to that streamlet will receive the new message. If a streamlet's TTL has expired, the handler process 351 sends an EOF message (392) to any MX nodes that are subscribed to the streamlet.

As described earlier in reference to FIG. 2, the messaging system 100 can include multiple channel managers (e.g., channel managers 214, 215). Multiple channel managers provide resiliency and prevent single point of failure. For instance, one channel manager can replicate lists of streamlets and current grants it maintains to another "slave" channel manager. As for another example, multiple channel managers can coordinate operations between them using distributed consensus protocols, such as, for example, Paxos or Raft protocols.

Figure 4A:
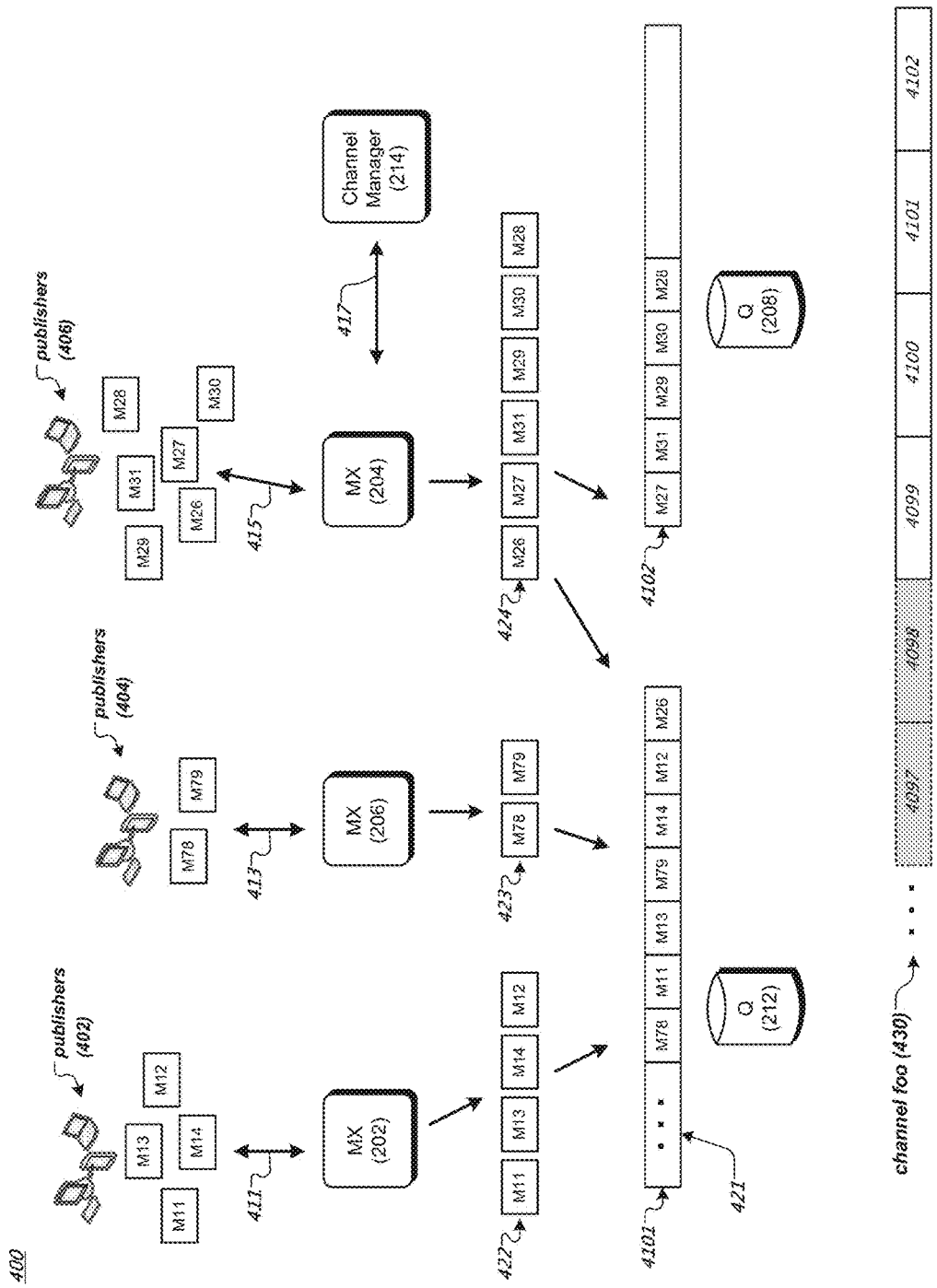
FIG. 4A is a data flow diagram of an example method for publishing messages to a channel of a messaging system.

FIG. 4A is a data flow diagram of an example method for publishing messages to a channel of a messaging system. In FIG. 4A, publishers (e.g., publisher clients 402, 404, 406) publish messages to the messaging system 100 described earlier in reference to FIG. 2. For instance, publishers 402 respectively establish connections 411 and send publish requests to the MX node 202. Publishers 404 respectively establish connections 413 and send publish requests to the MX node 206. Publishers 406 respectively establish connections 415 and send publish requests to the MX node 204. Here, the MX nodes can communicate (417) with a channel manager (e.g., channel manager 214) and one or more Q nodes (e.g., Q nodes 212 and 208) in the messaging system 100 via the internal network 218.

By way of illustration, each publish request (e.g., in JSON key/value pairs) from a publisher to an MX node includes a channel name and a message. The MX node (e.g., MX node 202) can assign the message in the publish request to a distinct channel in the messaging system 100 based on the channel name (e.g., "foo") of the publish request. The MX node can confirm the assigned channel with the channel manager 214. If the channel (specified in the subscribe request) does not yet exist in the messaging system 100, the channel manager can create and maintain a new channel in the messaging system 100. For instance, the channel manager can maintain a new channel by maintaining a list identifying each active streamlet of the channel's stream, the respective Q node on which the streamlet resides, and identification of the positions of the first and last messages in the streamlet as described earlier.

For messages of a particular channel, the MX node can store the messages in one or more buffers or streamlets in the messaging system 100. For instance, the MX node 202 receives from the publishers 402 requests to publish messages M11, M12, M13, and M14 to a channel foo. The MX node 206 receives from the publishers 404 requests to publish messages M78 and M79 to the channel foo. The MX node 204 receives from the publishers 406 requests to publish messages M26, M27, M28, M29, M30, and M31 to the channel foo.

The MX nodes can identify one or more streamlets for storing messages for the channel foo. As described earlier, each MX node can request a write grant from the channel manager 214 that allows the MX node to store the messages in a streamlet of the channel foo. For instance, the MX node 202 receives a grant from the channel manager 214 to write messages M11, M12, M13, and M14 to a streamlet 4101 on the Q node 212. The MX node 206 receives a grant from the channel manager 214 to write messages M78 and M79 to the streamlet 4101. Here, the streamlet 4101 is the last one (at the moment) of a sequence of streamlets of the channel stream 430 storing messages of the channel foo. The streamlet 4101 has messages (421) of the channel foo that were previously stored in the streamlet 4101, but is still open, i.e., the streamlet 4101 still has space for storing more messages and the streamlet's TTL has not expired.

The MX node 202 can arrange the messages for the channel foo based on the respective time that each message was received by the MX node 202, e.g., M11, M13, M14, M12 (422), and store the received messages as arranged in the streamlet 4101. That is, the MX node 202 receives M11 first, followed by M13, M14, and M12. Similarly, the MX node 206 can arrange the messages for the channel foo based on their respective time that each message was received by the MX node 206, e.g., M78, M79 (423), and store the received messages as arranged in the streamlet 4101. Other arrangements or ordering of the messages for the channel are possible.

The MX node 202 (or MX node 206) can store the received messages using the method for writing data to a streamlet described earlier in reference to FIG. 3A, for example. In various implementations, the MX node 202 (or MX node 206) can buffer (e.g., in a local data buffer) the received messages for the channel foo and store the received messages in a streamlet for the channel foo (e.g., streamlet 4101) when the buffered messages reach a predetermined number or size (e.g., 100 messages) or when a predetermined time (e.g., 50 milliseconds) has elapsed. For instance, the MX node 202 can store in the streamlet 100 messages at a time or in every 50 milliseconds. Other acknowledgement scheduling algorithms, such as Nagle's algorithm, can be used.

In various implementations, the Q node 212 (e.g., a handler process) stores the messages of the channel foo in the streamlet 4101 in the order as arranged by the MX node 202 and MX node 206. The Q node 212 stores the messages of the channel foo in the streamlet 4101 in the order the Q node 212 receives the messages. For instance, assume that the Q node 212 receives messages M78 (from the MX node 206) first, followed by messages M11 and M13 (from the MX node 202), M79 (from the MX node 206), and M14 and M12 (from the MX node 202). The Q node 212 stores in the streamlet 4101 the messages in the order as received, e.g., M78, M11, M13, M79, M14, and M12, immediately after the messages 421 that are already stored in the streamlet 4101. In this way, messages published to the channel foo from multiple publishers (e.g., 402, 404) can be serialized in a particular order and stored in the streamlet 4101 of the channel foo. Different subscribers that subscribe to the channel foo will receive messages of the channel foo in the same particular order, as will be described in more detail in reference to FIG. 4B.

In the example of FIG. 4A, at a time instance after the message M12 was stored in the streamlet 4101, the MX node 204 requests a grant from the channel manager 214 to write to the channel foo. The channel manager 214 provides the MX node 204 a grant to write messages to the streamlet 4101, as the streamlet 4101 is still open for writing. The MX node 204 arranges the messages for the channel foo based on the respective time that each message was received by the MX node 204, e.g., M26, M27, M31, M29, M30, M28 (424), and stores the messages as arranged for the channel foo.

By way of illustration, assume that the message M26 is stored to the last available position of the streamlet 4101. As the streamlet 4101 is now full, the Q node 212 sends to the MX node 204 a NAK message, following by an EOF message, to close the association with the MX node 204 for the write grant, as described earlier in reference to FIG. 3A. The MX node 204 then requests another write grant from the channel manager 214 for additional messages (e.g., M27, M31, and so on) for the channel foo.

The channel manager 214 can monitor available Q nodes in the messaging system 100 for their respective workloads (e.g., how many streamlets are residing in each Q node). The channel manager 214 can allocate a streamlet for the write request from the MX node 204 such that overloading (e.g., too many streamlets or too many read or write grants) can be avoided for any given Q node. For instance, the channel manager 214 can identify a least loaded Q node in the messaging system 100 and allocate a new streamlet on the least loaded Q node for write requests from the MX node 204. In the example of FIG. 4A, the channel manager 214 allocates a new streamlet 4102 on the Q node 208 and provides a write grant to the MX node 204 to write messages for the channel foo to the streamlet 4102. As shown in FIG. 4A, the Q node stores in the streamlet 4102 the messages from the MX node 204 in an order as arranged by the MX node 204: M27, M31, M29, M30, and M28 (assuming that there is no other concurrent write grant for the streamlet 4102 at the moment).

When the channel manager 214 allocates a new streamlet (e.g., streamlet 4102) for a request for a grant from an MX node (e.g., MX node 204) to write to a channel (e.g., foo), the channel manager 214 assigns to the streamlet its TTL, which will expire after TTLs of other streamlets that are already in the channel's stream. For instance, the channel manager 214 can assign to each streamlet of the channel foo's channel stream a TTL of 3 minutes when allocating the streamlet. That is, each streamlet will expire 3 minutes after it is allocated (created) by the channel manager 214. Since a new streamlet is allocated after a previous streamlet is closed (e.g., filled entirely or expired), in this way, the channel foo's channel stream comprises streamlets that each expires sequentially after its previous streamlet expires. For instance, as shown in an example channel stream 430 of the channel foo in FIG. 4A, streamlet 4098 and streamlets before 4098 have expired (as indicated by the dotted-lined gray-out boxes). Messages stored in these expired streamlets are not available for reading for subscribers of the channel foo. Streamlets 4099, 4100, 4101, and 4102 are still active (not expired). The streamlets 4099, 4100, and 4101 are closed for writing, but still are available for reading. The streamlet 4102 is available for reading and writing, at the moment when the message M28 was stored in the streamlet 4102. At a later time, the streamlet 4099 will expire, following by the streamlets 4100, 4101, and so on.

Figure 4B:
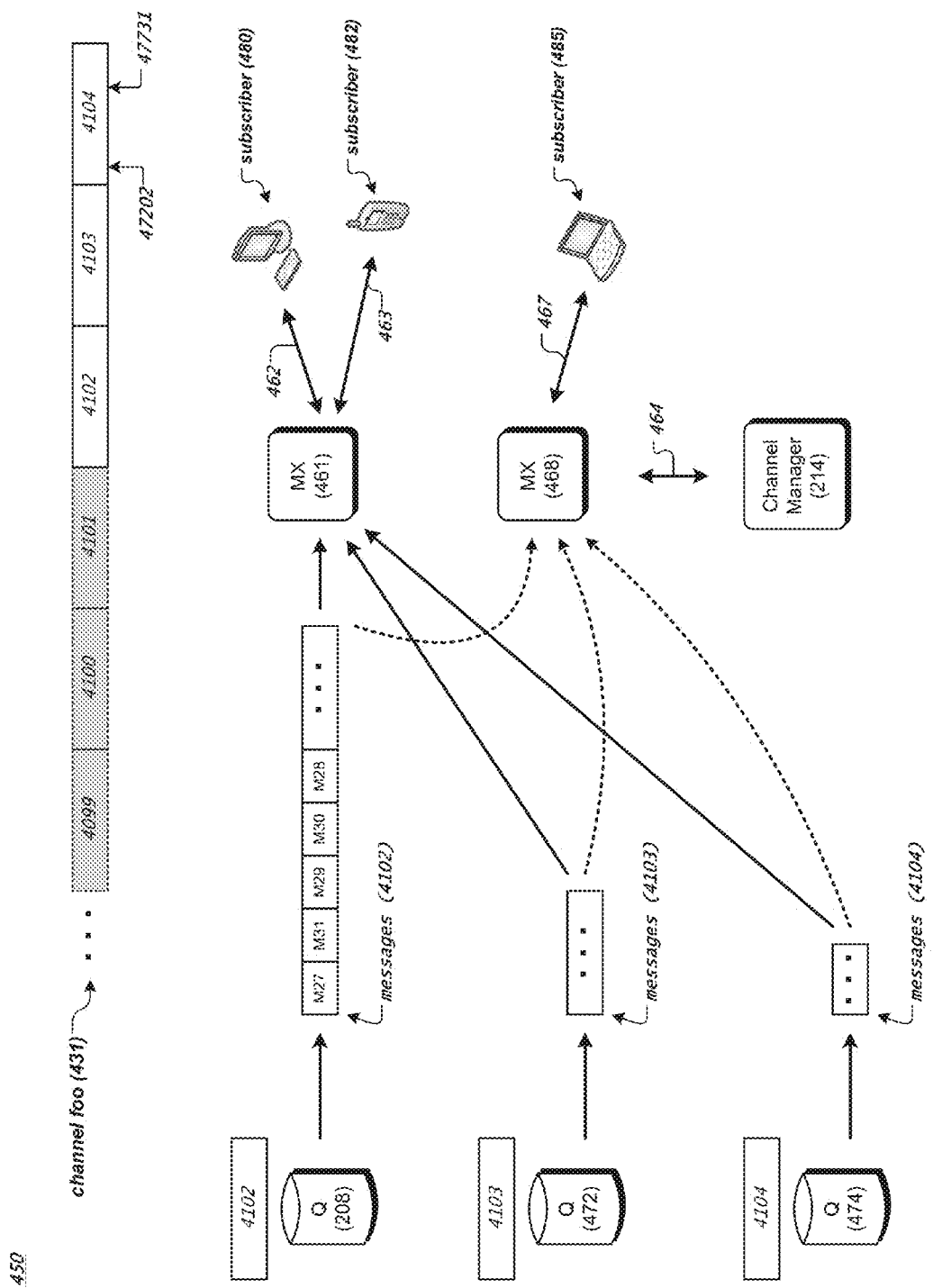
FIG. 4B is a data flow diagram of an example method for subscribing to a channel of a messaging system.

FIG. 4B is a data flow diagram of an example method for subscribing to a channel of a messaging system. In FIG. 4B, a subscriber 480 establishes a connection 462 with an MX node 461 of the messaging system 100. Subscriber 482 establishes a connection 463 with the MX node 461. Subscriber 485 establishes a connection 467 with an MX node 468 of the messaging system 100. Here, the MX nodes 461 and 468 can respectively communicate (464) with the channel manager 214 and one or more Q nodes in the messaging system 100 via the internal network 218.

A subscriber (e.g., subscriber 480) can subscribe to the channel foo of the messaging system 100 by establishing a connection (e.g., 462) and sending a request for subscribing to messages of the channel foo to an MX node (e.g., MX node 461). The request (e.g., in JSON key/value pairs) can include a channel name, such as, for example, "foo." When receiving the subscribe request, the MX node 461 can send to the channel manager 214 a request for a read grant for a streamlet in the channel foo's channel stream.

By way of illustration, assume that at the current moment the channel foo's channel stream 431 includes active streamlets 4102, 4103, and 4104, as shown in FIG. 4B. The streamlets 4102 and 4103 each are full. The streamlet 4104 stores messages of the channel foo, including the last message (at the current moment) stored at a position 47731. Streamlets 4101 and streamlets before 4101 are invalid, as their respective TTLs have expired. Note that the messages M78, M11, M13, M79, M14, M12, and M26 stored in the streamlet 4101, described earlier in reference to FIG. 4A, are no longer available for subscribers of the channel foo, since the streamlet 4101 is no longer valid, as its TTL has expired. As described earlier, each streamlet in the channel foo's channel stream has a TTL of 3 minutes, thus only messages (as stored in streamlets of the channel foo) that are published to the channel foo (i.e., stored into the channel's streamlets) no earlier than 3 minutes from the current time can be available for subscribers of the channel foo.

The MX node 461 can request a read grant for all available messages in the channel foo, for example, when the subscriber 480 is a new subscriber to the channel foo. Based on the request, the channel manager 214 provides the MX node 461 a read grant to the streamlet 4102 (on the Q node 208) that is the earliest streamlet in the active streamlets of the channel foo (i.e., the first in the sequence of the active streamlets). The MX node 461 can retrieve messages in the streamlet 4102 from the Q node 208, using the method for reading data from a streamlet described earlier in reference to FIG. 3B, for example. Note that the messages retrieved from the streamlet 4102 maintain the same order as stored in the streamlet 4102. However, other arrangements or ordering of the messages in the streamlet are possible. In various implementations, when providing messages stored in the streamlet 4102 to the MX node 461, the Q node 208 can buffer (e.g., in a local data buffer) the messages and send the messages to the MX node 461 when the buffer messages reach a predetermined number or size (e.g., 200 messages) or a predetermined time (e.g., 50 milliseconds) has elapsed. For instance, the Q node 208 can send the channel foo's messages (from the streamlet 4102) to the MX node 461 200 messages at a time or in every 50 milliseconds. Other acknowledgement scheduling algorithms, such as Nagle's algorithm, can be used.

After receiving the last message in the streamlet 4102, the MX node 461 can send an acknowledgement to the Q node 208, and send to the channel manager 214 another request (e.g., for a read grant) for the next streamlet in the channel stream of the channel foo. Based on the request, the channel manager 214 provides the MX node 461 a read grant to the streamlet 4103 (on Q node 472) that logically follows the streamlet 4102 in the sequence of active streamlets of the channel foo. The MX node 461 can retrieve messages stored in the streamlet 4103, e.g., using the method for reading data from a streamlet described earlier in reference to FIG. 3B, until it retrieves the last message stored in the streamlet 4103. The MX node 461 can send to the channel manager 214 yet another request for a read grant for messages in the next streamlet 4104 (on Q node 474). After receiving the read grant, the MX node 461 retrieves message of the channel foo stored in the streamlet 4104, until the last message at the position 47731. Similarly, the MX node 468 can retrieve messages from the streamlets 4102, 4103, and 4104 (as shown with dotted arrows in FIG. 4B), and provide the messages to the subscriber 485.

The MX node 461 can send the retrieved messages of the channel foo to the subscriber 480 (via the connection 462) while receiving the messages from the Q node 208, 472, or 474. In various implementations, the MX node 461 can store the retrieved messages in a local buffer. In this way, the retrieved messages can be provided to another subscriber (e.g., subscriber 482) when the other subscriber subscribes to the channel foo and requests the channel's messages. The MX node 461 can remove messages stored in the local buffer that each has a time of publication that has exceeded a predetermined time period. For instance, the MX node 461 can remove messages (stored in the local buffer) with respective times of publication exceeding 3 minutes. In some implementations, the predetermined time period for keeping messages in the local buffer on MX node 461 can be the same as or similar to the time-to-live duration of a streamlet in the channel foo's channel stream, since at a given moment, messages retrieved from the channel's stream do not include those in streamlets having respective time-to-lives that had already expired.

The messages retrieved from the channel stream 431 and sent to the subscriber 480 (by the MX node 461) are arranged in the same order as the messages were stored in the channel stream, although other arrangements or ordering of the messages are possible. For instance, messages published to the channel foo are serialized and stored in the streamlet 4102 in a particular order (e.g., M27, M31, M29, M30, and so on), then stored subsequently in the streamlet 4103 and the streamlet 4104. The MX node retrieves messages from the channel stream 431 and provides the retrieved messages to the subscriber 480 in the same order as the messages are stored in the channel stream: M27, M31, M29, M30, and so on, followed by ordered messages in the streamlet 4103, and followed by ordered messages in the streamlet 4104.

Instead of retrieving all available messages in the channel stream 431, the MX node 461 can request a read grant for messages stored in the channel stream 431 starting from a message at particular position, e.g., position 47202. For instance, the position 47202 can correspond to an earlier time instance (e.g., 10 seconds before the current time) when the subscriber 480 was last subscribing to the channel foo (e.g., via a connection to the MX node 461 or another MX node of the messaging system 100). The MX node 461 can send to the channel manager 214 a request for a read grant for messages starting at the position 47202. Based on the request, the channel manager 214 provides the MX node 461 a read grant to the streamlet 4104 (on the Q node 474) and a position on the streamlet 4104 that corresponds to the channel stream position 47202. The MX node 461 can retrieve messages in the streamlet 4104 starting from the provided position, and send the retrieved messages to the subscriber 480.

As described above in reference to FIGS. 4A and 4B, messages published to the channel foo are serialized and stored in the channel's streamlets in a particular order. The channel manager 214 maintains the ordered sequence of streamlets as they are created throughout their respective time-to-lives. Messages retrieved from the streamlets by an MX node (e.g., MX node 461, or MX node 468) and provided to a subscriber can be, in some implementations, in the same order as the messages are stored in the ordered sequence of streamlets. In this way, messages sent to different subscribers (e.g., subscriber 480, subscriber 482, or subscriber 485) can be in the same order (as the messages are stored in the streamlets), regardless which MX nodes the subscribers are connected to.

In various implementations, a streamlet stores messages in a set of blocks of messages. Each block stores a number of messages. For instance, a block can store two hundred kilobytes of messages. Each block has its own time-to-live, which can be shorter than the time-to-live of the streamlet holding the block. Once a block's TTL has expired, the block can be discarded from the streamlet holding the block, as described in more detail below in reference to FIG. 4C.

Figure 4C:
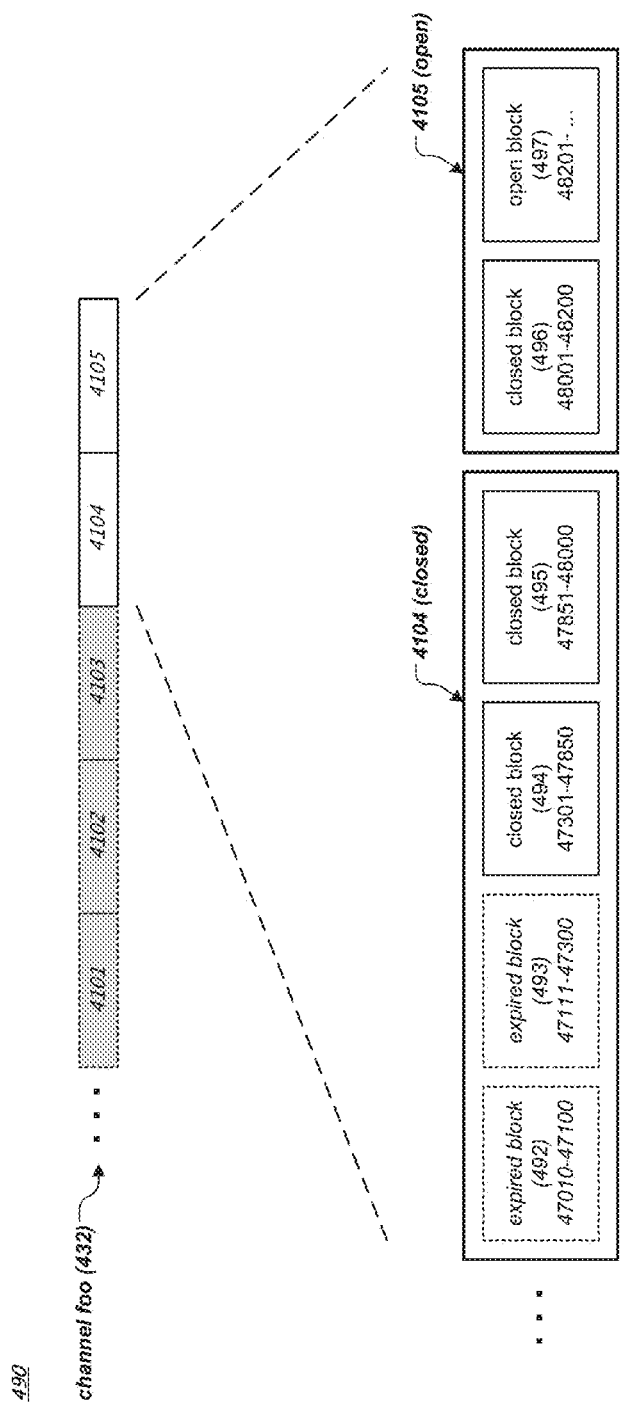
FIG. 4C is an example data structure for storing messages of a channel of a messaging system.

FIG. 4C is an example data structure for storing messages of a channel of a messaging system. As described with the channel foo in reference to FIGS. 4A and 4B, assume that at the current moment the channel foo's channel stream 432 includes active streamlets 4104 and 4105, as shown in FIG. 4C. Streamlet 4103 and streamlets before 4103 are invalid, as their respective TTLs have expired. The streamlet 4104 is already full for its capacity (e.g., as determined by a corresponding write grant) and is closed for additional message writes. The streamlet 4104 is still available for message reads. The streamlet 4105 is open and is available for message writes and reads.

By way of illustration, the streamlet 4104 (e.g., a computing process running on the Q node 474 shown in FIG. 4B) currently holds two blocks of messages. Block 494 holds messages from channel positions 47301 to 47850. Block 495 holds messages from channel positions 47851 to 48000. The streamlet 4105 (e.g., a computing process running on another Q node in the messaging system 100) currently holds two blocks of messages. Block 496 holds messages from channel positions 48001 to 48200. Block 497 holds messages starting from channel position 48201, and still accepts additional messages of the channel foo.

When the streamlet 4104 was created (e.g., by a write grant), a first block (sub-buffer) 492 was created to store messages, e.g., from channel positions 47010 to 47100. Later on, after the block 492 had reached its capacity, another block 493 was created to store messages, e.g., from channel positions 47111 to 47300. Blocks 494 and 495 were subsequently created to store additional messages. Afterwards, the streamlet 4104 was closed for additional message writes, and the streamlet 4105 was created with additional blocks for storing additional messages of the channel foo.

In this example, the respective TTL's of blocks 492 and 493 had expired. The messages stored in these two blocks (from channel positions 47010 to 47300) are no longer available for reading by subscribers of the channel foo. The streamlet 4104 can discard these two expired blocks, e.g., by de-allocating the memory space for the blocks 492 and 493. The blocks 494 or 495 could become expired and be discarded by the streamlet 4104, before the streamlet 4104 itself becomes invalid. Alternatively, streamlet 4104 itself could become invalid before the blocks 494 or 495 become expired. In this way, a streamlet can hold one or more blocks of messages, or contain no block of messages, depending on respective TTLs of the streamlet and blocks, for example.

A streamlet, or a computing process running on a Q node in the messaging system 100, can create a block for storing messages of a channel by allocating a certain size of memory space from the Q node. The streamlet can receive, from an MX node in the messaging system 100, one message at a time and store the received message in the block. Alternatively, the MX node can assemble (i.e., buffer) a group of messages and send the group of messages to the Q node. The streamlet can allocate a block of memory space (from the Q node) and store the group of messages in the block. The MX node can also perform compression on the group of messages, e.g., by removing a common header from each message or performing other suitable compression techniques.

Referring again to FIG. 2, in some examples, the systems and methods described herein balance load among the Q nodes for one or more channels. For example, when selecting a Q node to host a streamlet for a channel, the channel manager 214 can select the Q node based on its present workload (also referred to herein as "load") and/or based on an expected workload the Q node will have once the hosting begins. The workload of the Q node and other nodes can be determined using load data that provides an indication of how active or busy the Q nodes are at the current time and/or are projected to be in the future. The load data for a given Q node can include one or more load metrics, such as, for example, information about the number of messages being handled or processed by the Q node. In various implementations, the load data is or can include a combination of two or more load metrics. For example, the combination can be linear, non-linear, weighted, or un-weighted, although other combinations are possible. In one example, the load data can be a weighted combination of load metrics, with weights for the combination determined through experimental measurements and analysis of system performance. Linear regression or other data-fitting techniques can be used to determine the weights and/or the load metrics that have the greatest influence on workload and system performance. In some instances, the load data can include node-specific data representing loads on one or more Q nodes and/or channel-specific data representing loads associated with one or more channels. The load data can be or include, for example, a combination (e.g., a weighted combination) of node-specific data and/or channel-specific data.

In certain examples, the node-specific load data can include the rate at which messages are being written to the Q node and/or the rate at which messages are being delivered from the Q node. In general, the higher the rate at which the Q node is sending and/or receiving messages, the higher the workload is for the Q node. The rate of transfer to or from the Q node can be compared with maximum or threshold transfer rates for the Q node. The threshold transfer rates can be determined statically, for example, by observing a system configuration, such as a network interface (e.g., Ethernet) device's capacity. Alternatively or additionally, the threshold transfer rates can be determined dynamically, for example, by observing the maximum transfer rates at which response latencies remain at a pre-defined level. An initial threshold transfer rate can also be determined experimentally, such as during benchmarking of the system. In various instances, if the rate of transfer to and/or from the Q node is at, near or exceeds the maximum available or threshold transfer rate, the workload and/or the possible future workload for the Q node can be considered high, such that the Q node is less likely to be selected for hosting of additional streamlets at that time. In some examples, message transfer rates are measured in terms of the number of messages per time (e.g., messages per second) and/or the data transfer rate (e.g., bytes per second).

In some instances, the node-specific load data can include the number of streamlets or messages currently stored by the Q nodes. The storage in the Q node can be compared with a maximum or threshold storage value for the Q node. The threshold storage value can be determined statically, for example, by observing the system configuration and dedicating a portion of the system memory (e.g., RAM), such as 70%, 80%, 90% or other suitable percentage, to the application. An initial threshold storage value can be determined experimentally, such as during benchmarking of the system. In general, when storage in a Q node is at, near or exceeds the threshold storage value, the workload and/or possible future workload can be considered high and/or the Q node may have limited space for additional storage. In such cases, the Q node is less likely to be selected at that time for storage of additional streamlets. The number of messages stored by a Q node may be measured, for example, in bytes or in number of messages.

Alternatively or additionally, node-specific load data for a given Q node can include information about the number of channels or channel portions (i.e., streamlets) currently being hosted or processed by the Q node. The number of channels or channel portions being hosted or processed by the Q node can be compared with a maximum or threshold number of channels. If the number of channels hosted by the Q node is at, near or exceeds the maximum number of channels, the workload of the Q node and/or the possible future workload can be considered high. In various instances, the maximum number of channels can be limited by and/or determined from the system memory and/or the CPU and network overhead of keeping or maintaining a channel. An initial maximum number of channels can be determined experimentally, such as during benchmarking of the system. As messaging activity for a channel increases, the workload for the Q node hosting the channel can be expected to increase. The channel manager 214 can monitor trends in channel messaging activity to predict how the hosting of streamlets will influence Q node loads. If the expected workload associated with hosting a streamlet will be too high for a Q node, the channel manager 214 can select a different Q node that has sufficient workload capacity and/or available storage to host the streamlet.

In some instances, the node-specific load data for a Q node is measured based on the number of MX nodes that have been given read and/or write access to the Q node. The workload of a Q node can increase as the number of MX nodes having read/write access to the Q node increases. Additionally, the number of MX nodes having read/write access to the Q node can provide an indication of the possible future workload for the Q node. For example, when a large number of MX nodes have read/write access to the Q node, the potential for high message transfer rates exists, even though current message transfer rates may not be high. In such cases, the MX nodes can put higher demands on the Q node, as the activity level on corresponding channels increases. The node-specific load data for a Q node can include, in some instances, information regarding (i) the number of received requests from MX nodes to access streamlets stored on the Q node and/or (ii) the number of permissions granted to the MX nodes to access the streamlets.

In general, the node-specific load data for a Q node can include the processing rate for the Q node. A computation or processing rate for the Q node can be calculated and compared with a threshold or maximum processing value for the Q node. The threshold processing (CPU) value can be, for example, between 30% and 70% of a Q node CPU limit, to account for spikes, although other threshold processing values are possible. In one example, the threshold processing value can be determined by observing system behavior under actual production load and determining safe constraints, for example, by determining a level at which the system becomes unstable, which may be indicated by oscillations in traffic or processing rates. In one example, the threshold processing value can be equal to one-half or one-third of the processing rate corresponding to the onset of system instability, although other threshold processing values are possible. When the processing rate for the Q node is at, near, or exceeds the threshold processing value, the workload for the Q node can be considered high. With a high workload, the Q node is less likely to be selected by the channel manager 214 to host a new streamlet.

In addition to monitoring the Q node workloads, the channel manager 214 can also monitor rates of change in the workloads. The node-specific load data can include, for example, an indication of how the message transfer rates, message storage amounts, number of channels hosted, number of MX node connections, the processing rate for the Q node, and/or other load metrics are changing over time. The rates of change can be or include, for example, a derivative or slope associated with the load metrics. The rates of change can be used to predict what the workload will be in the future for the Q node. For example, the channel manager 214 can use the current workload and the rate of change to extrapolate (e.g., linearly) from the current workload to a predicted future workload.

In general, to determine if a current or future workload of a Q node is high, the systems and methods (e.g., the channel manager 214) can compare the current or future workload (e.g., a message transfer rate or a storage rate) with a threshold value. The threshold value can be, for example, a maximum value that should not be exceeded, to avoid performance issues. In some instances, the threshold value can be determined through experimental observation and/or is chosen to be a workload above which system performance is reduced or otherwise not optimal. The workload for a Q node can be expressed as a raw load level or as a percentage of the threshold value. In general, when the current or predicted workload is at or near (or even exceeds) the threshold value, the Q node can be considered overloaded and is less likely to be selected to host a new streamlet.

Additionally or alternatively, the systems and methods (e.g., the channel manager 214) can balance loads on the Q nodes by considering channel-specific data. In general, channel-specific data relates to information about a channel for which a new streamlet will be hosted. Channel-specific data can include, for example, the number of subscribers to a channel and/or the number of publishers to the channel. If the number of subscribers and/or publishers to the channel is high, an anticipated load associated with a new streamlet for the channel can also be high. Likewise, the channel-specific data can include a rate at which messages are published to the channel. A high publication rate for a channel is generally an indication that a workload associated with a new streamlet for the channel will be high. In some examples, the channel-specific data includes the number of interface nodes having permission to access the channel. In general, when a large number of interface nodes can access a channel, the expected workload for the channel will be high, for example, due to more requests to read from or write to the channel. Accordingly, channel-specific data can allow the channel manager 214 to predict a workload associated with a particular channel. The channel manager 214 can use the predicted workload to determine how much work will be associated with hosting a new streamlet for the channel. The channel manager 214 can then use the predicted workload to choose an appropriate Q node for hosting the new streamlet. For example, if the predicted workload for the streamlet is expected to be high, based on the channel-specific data, the channel manager 214 can choose a Q node having a workload that is low enough to handle the high workload associated with the new streamlet.

In various examples, the node-specific data and/or the channel-specific data can consider or include geographic location. For example, if channel activity is primarily expected to be in a particular geographic location (e.g., New Zealand), then the channel manager 214 can select a Q node that resides in or near the geographic location (e.g., in a New Zealand data center).

In some examples, the one or more Q nodes and/or the one or more MX nodes provide the channel manager 214 with the load data, including the node-specific data and/or the channel-specific data. The Q nodes can be configured, for example, to monitor their message transfer rates, messages storage amounts, MX node connections, etc., and any associated rates of change, and provide that information (e.g., node-specific data) to the channel manager 214. The same or similar node-specific information can be collected by MX nodes and/or provided to the channel manager 214 by MX nodes. The channel-specific data can likewise be collected by Q nodes and/or MX nodes and sent to the channel manager 214. For example, the Q nodes and/or the MX nodes can monitor one or more channels to determine the number of subscribers, the number of publishers, the rate of message publication, and/or the number of MX connections for the channels.

In general, the channel manager 214 uses the load data (i.e., node-specific data and/or channel-specific data) to balance loads among the various Q nodes. For example, the channel manager 214 can use the load data to select the next Q node for hosting a new streamlet. The next Q node can be chosen based on its current workload or projected future workload, compared to other Q nodes in the system. For example, when the channel manager 214 is selecting a Q node to host a streamlet for a channel, the channel manager 214 can choose a Q node that has the lowest workload or the lowest projected future workload among the available Q nodes. To predict the future workload, the channel manager 214 can estimate an additional workload associated with a future hosting task and add the additional workload to the current workload for the Q node. The channel manager 214 can also consider how many streamlets being hosted by the Q node will expire in the future, thereby reducing the Q node's workload.

In some cases, the channel manager 214 can predict a Q node's workload at a future time as follows: future workload=current workload+expected change in workload. The current workload is generally a Q node's workload at a current time. The expected change in workload is an expected difference between the current workload and the expected workload at the future time. The expected change in workload can be determined based on, for example, the predicted increase in workload (e.g., due to hosting new streamlets and/or increases in channel activity) and the predicted decrease in workload (e.g., due to streamlet expiration and/or decreases in channel activity).

In certain instances, the systems and methods (e.g., the channel manager 214 and/or the Q nodes) can monitor the workloads of the various Q nodes to determine when new streamlets need to be opened or closed. For example, the channel manager 214 can decide to close a streamlet on a Q node when a workload of the Q node is getting high. The channel manager 214 can then open a new streamlet for the corresponding channel on a different Q node, preferably selected based on the load data and Q node workloads, as described herein.

In various instances, when a first streamlet will be closed and a second streamlet immediately following the first streamlet will be opened, the channel manager 214 can open the second streamlet on the Q node that is hosting the first streamlet. When deciding to use the same Q node for the first and second streamlets, the channel manager 214 can first confirm that the workload of the Q node is below a threshold level, such that opening the second streamlet will not overload the Q node. Alternatively, if the workload of the Q node is above the threshold level, the channel manager 214 can select a different Q node, having a workload below the threshold level, to host the second streamlet.

In general, when selecting Q nodes to host new streamlets, the systems and methods can attempt to balance workloads among the available Q nodes. When a new streamlet will be opened, for example, the channel manager 214 can determine an expected workload associated with hosting the new streamlet. The channel manager 214 can then select a Q node to host the new streamlet based on the expected workload associated with hosting the streamlet. The Q node can be selected such that workloads are distributed equally across the Q nodes of the system. To determine workload inequality among the Q nodes, the channel manager 214 can determine a standard deviation of the workload distribution and select Q nodes for new hosting tasks in an effort to minimize the standard deviation. Other measurements of workload inequality can include, for example, the difference between a maximum workload and a minimum workload among the Q nodes, or the variance among the Q nodes. In general, when selecting the next Q node for hosting a streamlet, the channel manager 214 can make a Q node selection that reduces workload inequality among the Q nodes.

In certain examples, the channel manager 214 can send a request to a Q node to terminate hosting of a streamlet. The request to terminate can be sent, for example, when a determination is made that there are no subscribes to the channel associated with the streamlet and/or when a time-to-live for the streamlet has expired. In response to the request, the Q node can terminate the hosting of the streamlet and inform the channel manager 214 that the hosting has been terminated. Terminating the hosting of the streamlet can include, for example, closing the streamlet to further publication, closing the streamlet to further reading, and/or deleting message data associated with the streamlet. A decision to close a streamlet can be based on, for example, the determination that the size of the streamlet exceeds a threshold size, the determination that the age of the streamlet exceeds a threshold age (e.g., a TTL), and/or the determination that the hosting node has experienced a communication failure.

In some instances, an MX node informs the channel manager 214 about a request from a publisher to publish to a new channel. In such a case, the channel manager 214 can determine that the channel does not exist and, in response, can select a Q node to host a streamlet for the new channel. The Q node selection can be performed using the techniques described herein. The channel manager 214 can select the same Q node or a different Q node to host additional streamlets for the new channel (e.g., when a preceding or youngest streamlet is closed to further publication).

Figure 5:
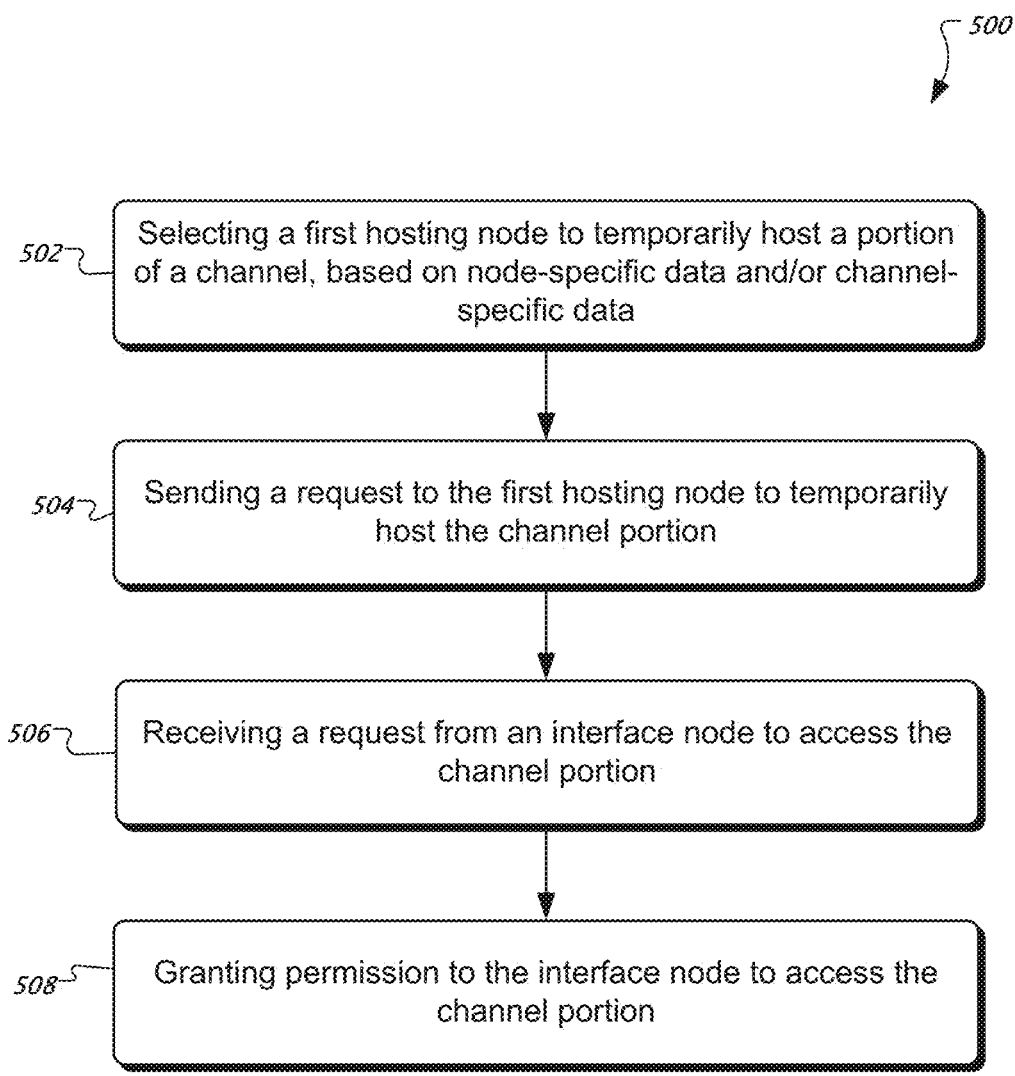
FIG. 5 is a flowchart of an example method for storing messages of a messaging system.

FIG. 5 is a flowchart of an example method for balancing workload among Q nodes of a publish-subscribe system. The method can be implemented using a channel manager, such as, for example, the channel manager 214 of the messaging system 100. The method begins by selecting (step 502), from a plurality of hosting nodes (i.e., Q nodes) of a publish-subscribe system, a first hosting node (i.e., a first Q node) to temporarily host a portion of a channel of the publish-subscribe system. In certain instances, temporarily hosting the channel portion includes temporarily storing one or more messages published to the channel, and temporarily providing, to a plurality of subscribers to the channel, access to the one or more messages. The method also includes sending (step 504), to the first hosting node of the publish-subscribe system, a request to temporarily host the channel portion. A request to access the channel portion is received (step 506) from an interface node (i.e., an MX node) of the publish-subscribe system. Permission to access the channel portion is granted (step 508) to the interface node. In general, selecting the first hosting node to temporarily host the channel portion includes selecting the first hosting node from the plurality of hosting nodes based, at least in part, on load data that includes node-specific data representing loads on the plurality of hosting nodes and/or channel-specific data representing a load associated with the channel.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A load-balancing method for a publish-subscribe system, the load-balancing method comprising:
   selecting, by one or more computer processors, a first hosting node from a plurality of hosting nodes based, at least in part, on load data comprising node-specific data representing loads on the plurality of hosting nodes and channel-specific data representing a load associated with a channel comprising a channel portion to be temporarily offloaded;
   sending, by the one or more computer processors, a request to the first hosting node to temporarily host the channel portion of the channel, wherein the request to the first hosting node to temporarily host the channel portion comprises an indication for one or more messages published to the channel to be temporarily stored and for access to the one or more messages to be temporarily provided to a plurality of subscribers, and wherein the one or more messages were previously stored on a second hosting node;
   receiving a request to access the channel portion; and
   granting permission to access the channel portion.

2. The load-balancing method of claim 1, wherein the node-specific data comprises one or more load metrics selected from at least one of: a number of channel portions being temporarily hosted by the respective hosting nodes, a number of interface nodes having permission to access the respective hosting nodes, a data reception rate of the respective hosting nodes, a data transmission rate of the respective hosting nodes, a storage utilization of the respective hosting nodes, or a processing rate of the respective hosting nodes.

3. The load-balancing method of claim 1, further comprising:
   receiving at least a portion of the node-specific data from the plurality of hosting nodes.

4. The load-balancing method of claim 1, further comprising:
   determining at least a portion of the node-specific data based, at least in part, on received requests to access the channel portion and on permissions granted to access the channel portion.

5. The load-balancing method of claim 1, wherein the channel-specific data comprises one or more load metrics selected from at least one of: a number of subscribers to the channel, a number of publishers to the channel, a rate at which messages are published to the channel, a rate at which messages are read from the channel, a number of interface nodes having permission to access the channel, or a channel portion size for the channel.

6. The load-balancing method of claim 1, further comprising:
receiving at least a portion of the channel-specific data from at least one of a hosting node or an interface node.

7. The load-balancing method of claim 1, wherein selecting the first hosting node from the plurality of hosting nodes based, at least in part, on the load data comprises:
determining, based at least in part on the node-specific data, that a load on the first hosting node is lowest among respective loads on the hosting nodes; and
selecting the first hosting node based, at least in part, on the determination.

8. The load-balancing method of claim 1, wherein selecting the first hosting node from the plurality of hosting nodes based, at least in part, on the load data comprises:
determining, based at least in part on the node-specific data, that a load on the first hosting node is below a threshold load level; and
selecting the first hosting node based, at least in part, on the determination.

9. The load-balancing method of claim 1, wherein selecting the first hosting node from the plurality of hosting nodes based, at least in part, on the load data comprises:
determining, based at least in part on a portion of the node-specific data corresponding to the first hosting node and on a portion of the channel-specific data corresponding to the channel, an expected load on the first hosting node that would result from the first hosting node hosting the portion of the channel;
determining that the expected load on the first hosting node is below a threshold load level; and
selecting the first hosting node based, at least in part, on the determination that the expected load on the first hosting node is below the threshold load level.

10. The load-balancing method of claim 1, wherein the channel portion comprises a first portion of the channel, wherein the channel further comprises a second channel portion, and wherein selecting the first hosting node from the plurality of hosting nodes based, at least in part, on the load data comprises:
determining that the first hosting node hosts the second channel portion;
determining that a load on the first hosting node is below a threshold load level; and
selecting the first hosting node based, at least in part, on the determinations that the first hosting node hosts the second channel portion and that the load on the first hosting node is below the threshold load level.

11. The load-balancing method of claim 1, wherein the Channel portion comprises a first portion of the channel, wherein the channel further comprises a second channel portion, and wherein selecting the first hosting node from the plurality of hosting nodes based, at least in part, on the load data comprises:
determining that the second hosting node hosts the second channel portion;
determining that a load on the second hosting node is above a threshold load level;
determining that a load on the first hosting node is below the threshold load level; and
selecting the first hosting node based, at least in part, on the determinations that the load on the second hosting node is above the threshold load level and that the load on the first hosting node is below the threshold load level.

12. The load-balancing method of claim 1, wherein selecting the first hosting node from the plurality of hosting nodes based, at least in part, on the load data comprises:
determining, based at least in part on a portion of the channel-specific data, an expected load associated with hosting the channel portion;
determining, based at least in part on the node-specific data and on the expected load associated with hosting the channel portion, that hosting the channel portion on the first hosting node would reduce inequality of load distribution among the hosting nodes; and
selecting the first hosting node based, at least in part, on the determination that hosting the channel portion on the first hosting node would reduce inequality of load distribution among the hosting nodes.

13. A computing device, comprising:
a channel manager node operable to:
select a first hosting node from a plurality of hosting nodes based, at least in part, on load data comprising node-specific data representing loads on the plurality of hosting nodes and channel-specific data representing a load associated with a channel comprising a channel portion to be temporarily offloaded;
send a request to the first hosting node to temporarily host the channel portion of the channel, wherein the request to the first hosting node to temporarily host the channel portion comprises an indication for one or more messages published to the channel to be temporarily stored and for access to the one or more messages to be temporarily provided to a plurality of subscribers to the channel, and wherein the one or more messages were previously stored on a second hosting node;
receive, from an interface node, a request to access the channel portion; and
grant, to the interface node, permission to access the channel portion.

14. The computing device of claim 13, wherein to select the first hosting node from the plurality of hosting nodes based, at least in part, on the load data the channel manager node is further to:
determine, based at least in part on the node-specific data, that a load on the first hosting node is lowest among respective loads on the hosting nodes; and
select the first hosting node based, at least in part, on the determination.

15. The computing device of claim 13, wherein to select the first hosting node from the plurality of hosting nodes based, at least in part, on the load data the channel manager node is further to:
determine, based at least in part on the node-specific data, that a load on the first sting node is below a threshold load level; and
select the first hosting node based, at least in part, on the determination.

16. The computing device of claim 13, wherein to select the first hosting node from the plurality of hosting nodes based, at least in part, on the load data the channel manager node is further to:
determine, based at least in part on a portion of the node-specific data corresponding to the first hosting node and on a portion of the channel-specific data corresponding to the channel, an expected load on the first hosting node that would result from the first hosting node hosting the portion of the channel;

determine that the expected load on the first hosting node is below a threshold load level; and select the first hosting node based, at least in part, on the determination that the expected load on the first hosting node is below the threshold load level.

17. The computing device of claim 13, wherein the channel portion comprises a first portion of the channel, wherein the channel further comprises a second channel portion, and wherein to select the first hosting node from the plurality of hosting nodes based, at least in part, on the load data the channel manager node is further to:

determine that the first hosting node hosts the second channel portion;

determine that a load on the first hosting node is below a threshold load level; and select the first hosting node based, at least in part, on the determinations that the first hosting node hosts the second channel portion and that the load on the first hosting node is below the threshold load level.

18. The computing device of claim 13, wherein the channel portion comprises a first portion of the channel, wherein the channel further comprises a second channel portion, and wherein to select the first hosting node from the plurality of hosting nodes based, at least in part, on the load data the channel manager node is further to:

determine that the second hosting node hosts the second channel portion;

determine that a load on the second hosting node is above a threshold load level;

determine that a load on the first hosting node is below the threshold load level; and select the first hosting node based, at least in part, on the determinations that the load on the second hosting node is above the threshold load level and that the load on the first hosting node is below the threshold load level.

19. The computing device of claim 13, wherein to select the first hosting node from the plurality of hosting nodes based, at least in part, on the load data the channel manager node is further to:

determine, based at least in part on a portion of the channel-specific data, an expected load associated with hosting the channel portion;

determine, based at least in part on the node-specific data and on the expected load associated with hosting the channel portion, that hosting the channel portion on the first hosting node would reduce inequality of load distribution among the hosting nodes; and select the first hosting node based, at least in part, on the determination that hosting the channel portion on the first hosting node would reduce inequality of load distribution among the hosting nodes.

20. A non-transitory machine-readable medium having instructions stored thereon that, when executed by one or more computer processors, cause the one or more computer processors to:

select a first hosting node from a plurality of hosting nodes based, at least in part, on load data comprising node-specific data representing loads on the plurality of hosting nodes and channel-specific data representing a load associated with a channel comprising a channel portion to be temporarily offloaded;

send, to the first hosting node, a request to temporarily host the channel portion of the channel, wherein the request to the first hosting node to temporarily host the channel portion comprises an indication for one or more messages published to the channel to be temporarily stored and for access to the one or more messages to be temporarily provided to a plurality of subscribers, and wherein the one or more messages were previously stored on a second hosting node;

receive a request to access the channel portion; and grant permission to access the channel portion.

* * * * *